United States Patent
Watanabe et al.

(10) Patent No.: US 6,836,040 B2
(45) Date of Patent: Dec. 28, 2004

(54) SPINDLE MOTOR USING HYDRAULIC BEARING AND DISK DRIVE ON WHICH SPINDLE MOTOR IS MOUNTED

(75) Inventors: Minoru Watanabe, Tokyo (JP); Toshio Mamiya, Tokyo (JP); Takashi Yamada, Tokyo (JP); Kazuyuki Yamamoto, Kanagawa (JP)

(73) Assignee: Sony Corporation (JP)

( * ) Notice: Subject to any disclaimer, the term of this patent is extended or adjusted under 35 U.S.C. 154(b) by 91 days.

(21) Appl. No.: 10/145,729

(22) Filed: May 16, 2002

(65) Prior Publication Data

US 2002/0190590 A1 Dec. 19, 2002

(30) Foreign Application Priority Data

May 21, 2001 (JP) .................................... P2001-151137

(51) Int. Cl.[7] .......................... H02K 5/16; F16C 32/06
(52) U.S. Cl. ...................... 310/90; 310/67 R; 384/100
(58) Field of Search ................................ 310/90, 67 R, 310/89; 384/114, 111, 112, 100

(56) References Cited

U.S. PATENT DOCUMENTS

| | | | | | |
|---|---|---|---|---|---|
| 5,311,383 A | * | 5/1994 | Yokouchi | ................... | 360/99.08 |
| 5,357,162 A | * | 10/1994 | Aiyoshizawa et al. | ........ | 310/90 |
| 5,538,347 A | * | 7/1996 | Itoh et al. | .................... | 384/107 |
| 5,667,309 A | * | 9/1997 | Nose | ........................... | 384/132 |
| 5,707,154 A | * | 1/1998 | Ichiyama | .................... | 384/107 |
| 6,034,454 A | * | 3/2000 | Ichiyama | .................... | 310/90 |
| 6,040,648 A | * | 3/2000 | Kawawada et al. | .......... | 310/90 |
| 6,059,459 A | * | 5/2000 | Ichiyama | .................... | 384/112 |
| 6,160,334 A | * | 12/2000 | Teshima et al. | .......... | 310/67 R |
| 6,176,618 B1 | * | 1/2001 | Kawawada et al. | ......... | 384/107 |
| 6,247,848 B1 | * | 6/2001 | Iwaki et al. | ................ | 384/107 |
| 6,250,808 B1 | * | 6/2001 | Ichiyama | .................... | 384/100 |
| 6,271,612 B1 | * | 8/2001 | Tanaka et al. | ................ | 310/90 |
| 6,307,291 B1 | * | 10/2001 | Iwaki et al. | .................. | 310/90 |
| 6,316,857 B1 | * | 11/2001 | Jeong | .......................... | 310/90 |
| 6,340,854 B1 | * | 1/2002 | Jeong | .......................... | 310/90 |
| 6,384,503 B1 | * | 5/2002 | Iwaki et al. | ........... | 310/156.47 |
| 6,420,810 B1 | * | 7/2002 | Jeong | ........................ | 310/90.5 |
| 6,431,757 B1 | * | 8/2002 | Nakazeki et al. | .......... | 384/107 |
| 6,456,458 B1 | * | 9/2002 | Ichiyama | ................ | 360/99.08 |
| 2002/0181151 A1 | * | 12/2002 | Obata et al. | ............. | 360/99.08 |

* cited by examiner

Primary Examiner—Burton S. Mullins
Assistant Examiner—Heba Y. Elkassabgi
(74) Attorney, Agent, or Firm—Rader, Fishman & Grauer PLLC; Ronald P. Kananen

(57) ABSTRACT

A spindle motor using a hydraulic bearing is provided, wherein an R-face or C-face is formed on each of upper and lower edges of an outer periphery of a rotating disk portion rotatable integrally with a spindle, and the R-face or C-face is formed into a mirror-finished surface having a surface roughness of 0.3 s or less in Ra, preferably, 0.1 s or less in Ra. Alternatively, a recess may be formed in a portion, facing to each of the upper and lower edges of the outer periphery of the rotating disk portion, of an inner wall surface of the hydraulic bearing. Such a spindle motor provides a disk drive capable of suppressing a variation in rotational speed of the spindle motor caused by tilting of the spindle due to vibration and impact, thereby ensuring a stable recording or reproducing operation.

5 Claims, 19 Drawing Sheets

US 6,836,040 B2

SPINDLE MOTOR USING HYDRAULIC BEARING AND DISK DRIVE ON WHICH SPINDLE MOTOR IS MOUNTED

BACKGROUND OF THE INVENTION

The present invention relates to a spindle motor using a hydraulic bearing, for example, adapted to a large volume disk drive such as a removable hard disk drive, and to a disk drive on which such a spindle motor is mounted.

In disk drives such as removable-hard disk drives (hereinafter, referred to as "R-HDDs"), information has been recorded and/or reproduced by removably mounting an information recording disk such as a hard disk, which has been previously contained in a removable-hard disk cartridge (hereinafter, referred to as "R-HDC"), to a spindle motor, rotating the disk at a high speed by the spindle motor to generate an air flow on a surface of the disk, and flying a flying head slider supported on a leading end of a head actuator via a suspension over a surface of the disk, thereby seeking recording tracks on the disk.

A spindle motor 101 using a hydraulic bearing shown in FIG. 17 is used for R-HDDs of this type.

The configuration of the spindle motor 101 will be described below. An approximately cruciform hydraulic bearing 103 is formed in an approximately central portion of a motor base 102. A spindle 104 has a lower end 104a and a rotating disk portion 105 fixed to or formed integrally with an outer periphery of an approximately intermediate portion of the spindle 104 in the axial direction. The lower end 104a of the spindle 104 and the rotating disk portion 105 are floated in oil 106 that is a fluid previously put to fill the hydraulic bearing 103. Upper and lower portions of the hydraulic bearing 103 are sealed with an upper plate 107 and a lower plate 108 fixed to upper and lower portions of the motor base 102, respectively. An inner wall surface 103a, on the motor base 102 side, of the hydraulic bearing 103 is separated from each of an outer peripheral surface of the lower end 104a and an outer surface of the rotating disk portion 105 with a fine gap put therebetween. The outer peripheral surface of the lower end 104a of the spindle 104 has a plurality of annular grooves 109, and also each of the upper and lower sides of the outer surface of the rotating disk portion 105 has a plurality of annular grooves 110. Because of the action of a dynamic pressure of the oil 106 caused in these annular grooves 109 and 110, the spindle 104 and the rotating disk portion 105 are integrally rotated in a state being floated on the oil 106, that is, in a state being not in contact with the inner wall surface 103a of the hydraulic bearing 103.

A rotor 111 is fixed to a portion, near an upper end 104b, of the spindle 104. A disk table 112, to which a hard disk or the like is to be exchangeably mounted, is formed on a central portion of the upper end of the rotor 111. An annular magnet 113 is fixed to an inner periphery of the lower end of the rotor 111. A stator 116, which is composed of a stack 114 of silicon steel plates and a plurality of coils 115 wound around the stack 114, is mounted at a portion between the outer periphery of the hydraulic bearing 103 of the motor base 102 and the inner periphery of the magnet 113.

A rotational force is generated between the plurality of coils 115 and the magnet 113 by switching the supply of a current to the coils 115, whereby the rotor 111 is rotated, together with the spindle 104 and the rotating disk portion 105, with respect to the motor base 102. The spindle motor 101 having the above configuration functions as a flat brushless motor.

The related art spindle motor 101 using the hydraulic bearing 103, however, has a disadvantage. In this spindle motor 101, each of a pair of upper and lower corners of the outer periphery of the rotating disk portion 105 is formed as a sharp edge 105a. By the way, a moment stronger than a dynamic pressure caused in the hydraulic bearing 103 is generated due to external vibration/impact and the like applied during operations of recording and/or reproducing information on and/or from a hard disk or the like. Consequently, as shown in FIG. 18, when an axis P2 of the spindle 104 is tilted in the hydraulic bearing 103 with respect to a vertical reference P1 of the motor base 102 at a specific angle θ1, the sharp edges 105a of the outer periphery of the rotating disk portion 105 may be often brought into contact with the inner wall surface 103a, particularly, of the upper plate 107 of the hydraulic bearing 103.

The frictional force caused by such contact acts as a braking force against rotation of the rotor 111, to cause a variation in rotational speed of the rotor 111, thereby failing to stably record and/or reproduce information on and/or from a hard disk or the like.

SUMMARY OF THE INVENTION

An object of the present invention is to provide a spindle motor using a hydraulic bearing, which is capable of preventing a variation in rotational speed of the spindle motor as much as possible, which variation is caused by tilting of the axis of the spindle motor due to external vibration/impact and the like, and to provide a disk drive using such a spindle motor.

To achieve the above object, according to a first aspect of the present invention, there is provided a spindle motor including a spindle; a rotating disk portion rotatable integrally with the spindle; and a hydraulic bearing, formed in a motor base, for rotatably supporting the rotating disk portion; wherein an escape portion is provided for preventing the rotating disk portion from being brought into contact with an inner wall surface of the hydraulic bearing when the spindle is tilted with respect to the motor base at a specific angle or less.

The escape portion is preferably configured as an R-face or a C-face formed at an edge of an outer periphery of the rotating disk portion.

The escape portion is preferably configured as a recess formed in the inner wall surface of the hydraulic bearing at a position facing to an edge of an outer periphery of the rotating disk portion.

A region, to be brought into contact with the inner wall surface of the hydraulic bearing when the spindle is tilted with respect to the motor base at an angle more than the specific angle, of the rotating disk portion is preferably formed into a mirror-finished surface having a surface roughness of 0.3 s or less in Ra.

A region, to be brought into contact with the rotating disk portion when the spindle is tilted with respect to the motor base at an angle more than the specific angle, of the inner wall surface of the hydraulic bearing is formed into a mirror-finished surface having a surface roughness of 0.3 s or less in Ra.

To achieve the above object, according to a second aspect of the present invention, there is provided a disk drive including a spindle motor including a spindle, a rotating disk portion rotatable integrally with the spindle, and a hydraulic bearing, formed in a motor base, for rotatably supporting the rotating disk portion, the disk drive being operated to rotate an information recording disk by the spindle motor, thereby recording and/or reproducing information on and/or from the disk by a flying head slider; wherein an escape portion is provided for preventing the rotating disk portion from being brought into contact with an inner wall surface of the hydraulic bearing when the spindle is tilted with respect to the motor base at a specific angle or less.

To achieve the above object, according to a third aspect of the present invention, there is provided a hydraulic bearing structure including a hydraulic bearing, formed in a motor base, for rotatably supporting a rotating disk portion rotatable integrally with a spindle; wherein an escape portion is provided for preventing the rotating disk portion from being brought into contact with an inner wall surface of the hydraulic bearing when the spindle is tilted with respect to the motor base at a specific angle or less.

With the configuration of the spindle motor using a hydraulic bearing according to the first aspect of the present invention, since an escape portion is provided for preventing the rotating disk portion rotating in the hydraulic bearing together with the spindle from being brought into contact with an inner wall surface of the hydraulic bearing when the spindle is tilted with respect to the motor base at a specific angle or less, the contact of the rotating disk portion with the inner wall surface of the hydraulic bearing due to external vibration/impact and the like applied during rotation of the spindle motor can be prevented as much as possible.

The above escape portion for preventing the rotating disk portion from being brought into contact with the inner wall surface of the hydraulic bearing by tilting of the spindle with respect to the motor base can be configured as an R-face or C-face formed at an edge of the outer periphery of the rotating disk portion or a recess formed in the inner wall surface of the hydraulic bearing so as to face to the edge of the outer periphery of the rotating disk portion.

A region, to be brought into contact with the inner wall surface of the hydraulic bearing when the spindle is tilted with respect to the motor base at an angle more than the specific angle, or a region, to be brought into contact with the rotating disk portion when the spindle is tilted with respect to the motor base at an angle more than the specific angle, of the inner wall surface of the hydraulic bearing, can be formed into a mirror-finished surface having a surface roughness of 0.3 s or less in Ra.

With the configuration of the disk drive according to the second aspect of the present invention, an escape portion is provided for preventing the rotating disk portion rotating in the hydraulic bearing together with the spindle from being brought into contact with the inner wall surface of the hydraulic bearing when the spindle is tilted with respect to the motor base at a specific angle or less during operation of the disk drive for rotating an information recording disk by the spindle motor using the hydraulic bearing, thereby recording and/or reproducing information on and/or from the disk by the flying head slider. As a result, the contact of the rotating disk portion with the inner wall surface of the hydraulic bearing due to external vibration/impact and the like applied during operations of recording and/or reproducing information on and/or from the disk can be prevented as much as possible.

With the configuration of the hydraulic bearing structure according to the third aspect of the present invention, an escape portion is provided for preventing, even if the hydraulic bearing structure is used for not only a spindle motor but also a general motor, the rotating disk portion rotating in the hydraulic bearing together with the spindle from being brought into contact with an inner wall surface of the hydraulic bearing when the spindle is tilted with respect to the motor base at a specific angle or less. As a result, the contact of the rotating disk portion with the inner wall surface of the hydraulic bearing due to external vibration/impact and the like can be prevented as much as possible.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Hereinafter, embodiments of a spindle motor using a hydraulic bearing and a removable-hard disk drive using the spindle motor according to the present invention will be described with reference to the drawings.

The description of the embodiments will be made in the following order:

(1) First Embodiment of Spindle Motor Using Hydraulic Bearing (FIGS. 1 and 2)
(2) Second Embodiment of Spindle Motor Using Hydraulic Bearing (FIGS. 3 and 4)
(3) Third Embodiment of Spindle Motor Using Hydraulic Bearing (FIGS. 5 and 6)
(4) Fourth Embodiment of Spindle Motor Using Hydraulic Bearing (FIG. 7)
(5) Description of Removable-Hard Disk Drive Using Spindle Motor (FIGS. 8 to 16)
(6) Description of Dynamic Load/Unload Mechanism of Removable-Hard Disk Drive (FIGS. 13 to 16)

(1) First Embodiment of Spindle Motor Using Hydraulic Bearing

Figure 1:
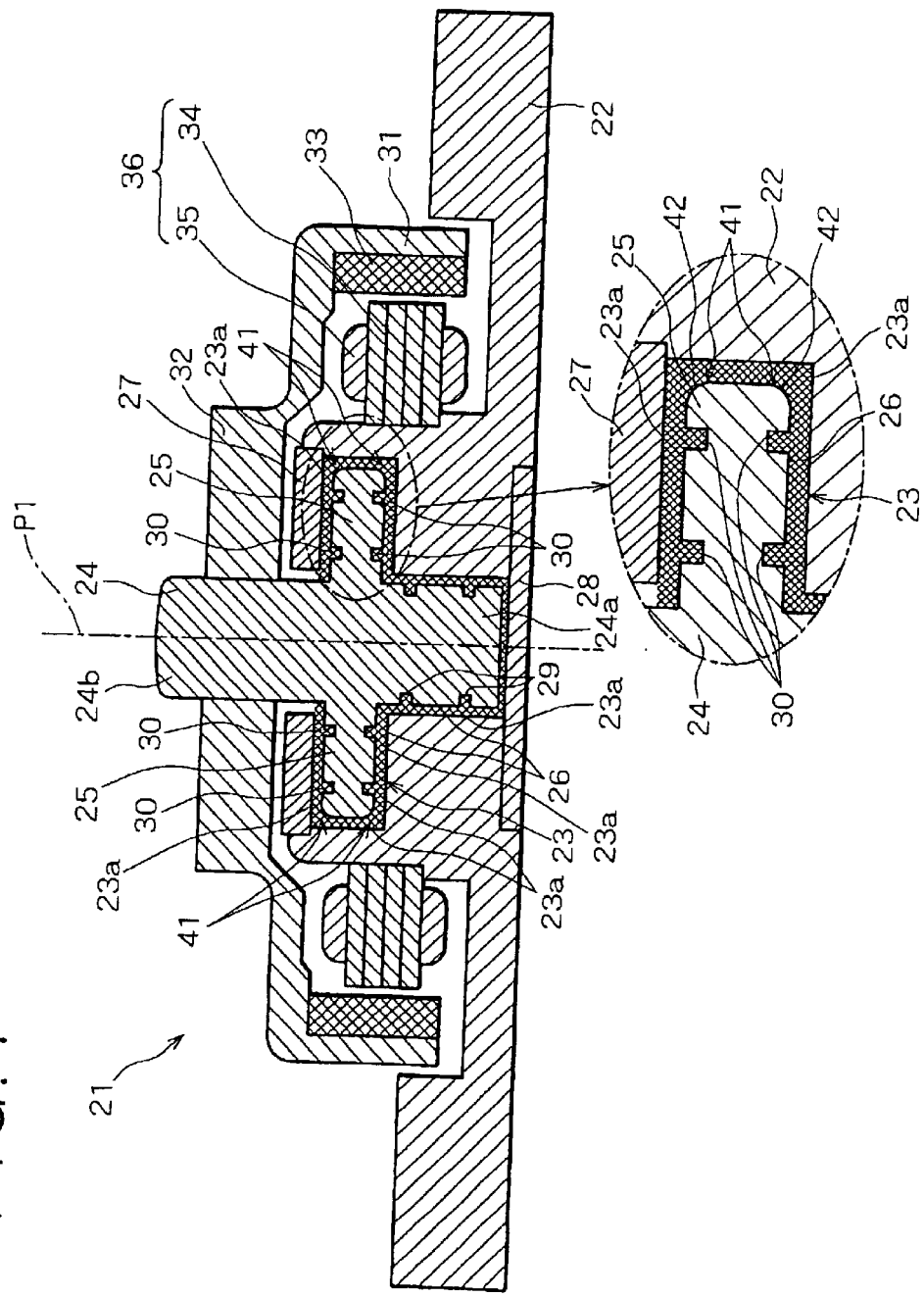
FIG. 1 is a sectional side view illustrating a first embodiment of a spindle motor using a hydraulic bearing according to the present invention.
Figure 2:
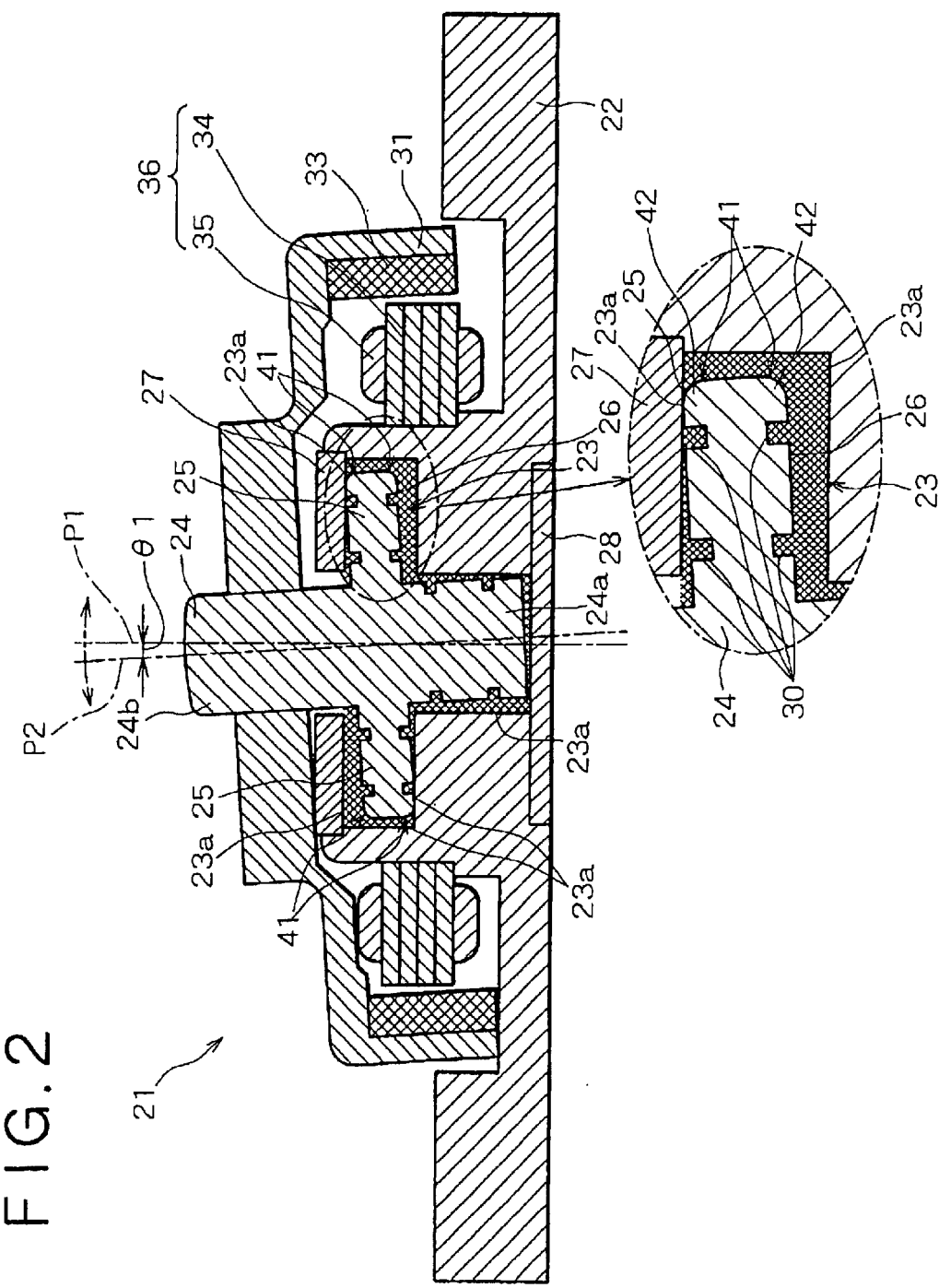
FIG. 2 is a sectional side view showing a state that a spindle of the spindle motor shown in FIG. 1 is tilted.

A first embodiment of a spindle motor using a hydraulic bearing, which is applied to a removable-hard disk drive (R-HDD) to be described later, will be described with reference to FIGS. 1 and 2.

A configuration of a spindle motor 21 will be described below. An approximately cruciform hydraulic bearing 23 is formed in an approximately central portion of a motor base 22. A spindle 24 includes a lower end 24a, and a rotating disk portion 25 fixed to or formed integrally with an outer periphery of an approximately intermediate portion of the spindle 24 in the axial direction. The lower end 24a of the spindle 24 and the rotating disk portion 25 are floated in oil 26 that is a fluid previously put to fill the hydraulic bearing 23. Upper and lower portions of the hydraulic bearing 23 are sealed with an upper plate 27 and a lower plate 28 removably fixed to upper and lower portions of the motor base 22 by screwing or the like, respectively. An inner wall surface 23a, on the motor base 22 side, of the hydraulic bearing 23 is separated from each of an outer peripheral surface of the lower end 24a and an outer surface of the rotating disk portion 25 with a fine gap put therebetween. The outer peripheral surface of the lower end 24a of the spindle 24 has a plurality of annular grooves 29, and each of the upper and lower sides of the outer surface of the rotating disk portion 25 has a plurality of annular grooves 30. Because of an action of a dynamic pressure of the oil 26 caused in these annular grooves 29 and 30, the spindle 24 and the rotating disk portion 25 are integrally rotated in a state being floated on the oil 26, that is, in a state being not in contact with the inner wall surface 23a of the hydraulic bearing 23. It is to be noted that the annular grooves 29 and 30 may be formed in the inner wall surface 23a of the hydraulic bearing 23.

A rotor 31 is fixed to a portion, near an upper end 24b, of the spindle 24. A disk table 32, to which a hard disk (which will be described later) or the like is to be exchangeably mounted, is formed on a central portion of the upper end of the rotor 31. An annular magnet 33 is fixed to an inner periphery of the lower end of the rotor 31. A stator 36, which is composed of a stack 34 of silicon steel plates and a plurality of coils 35 wound around the stack 34, is mounted to a portion between the outer periphery of the hydraulic bearing 23 of the motor base 22 and the inner periphery of the magnet 33.

A rotational force is generated between the plurality of coils 35 and the magnet 33 by switching the supply of a current to the coils 35, whereby the rotor 31 is rotated, together with the spindle 24 and the rotating disk portion 25, with respect to the motor base 22.

As is apparent from the above description, the spindle motor 21 functions as a flat brushless motor.

According to the first embodiment, an escape portion 41 is provided for preventing the rotating disk portion 25 from being brought into contact with the inner wall surface 23a of the hydraulic bearing 23 even when the spindle 24 is tilted with respect to the motor base 22 at a specific angle $\theta 1$ or less, wherein the escape portion 41 is configured as an R-face 42 formed on each of a pair of upper and lower edges of the outer peripheral portion of the rotating disk portion 25.

Figure 17:
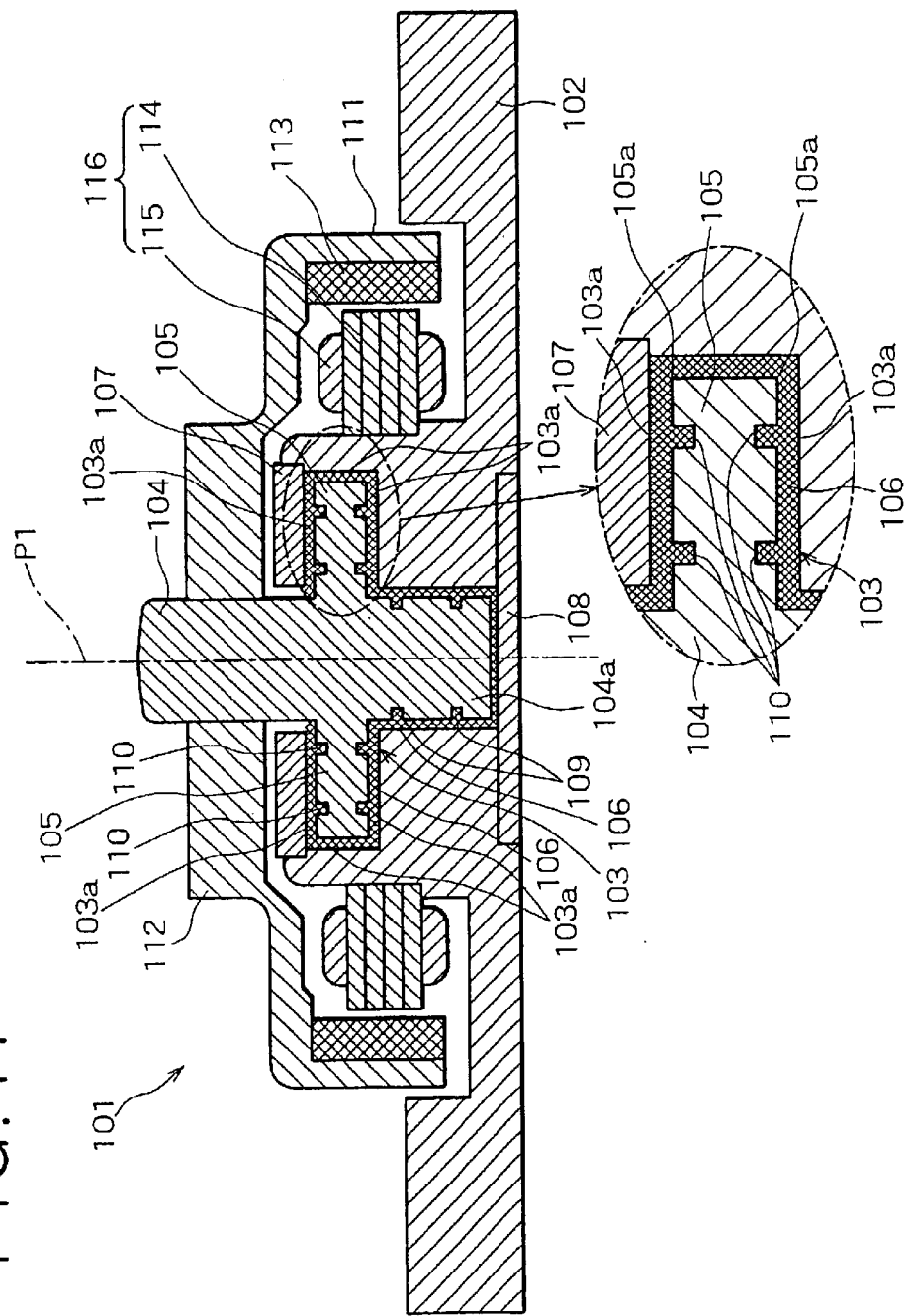
FIG. 17 is a sectional side view of a spindle motor using a hydraulic bearing used for a related art removable-hard disk drive
Figure 18:
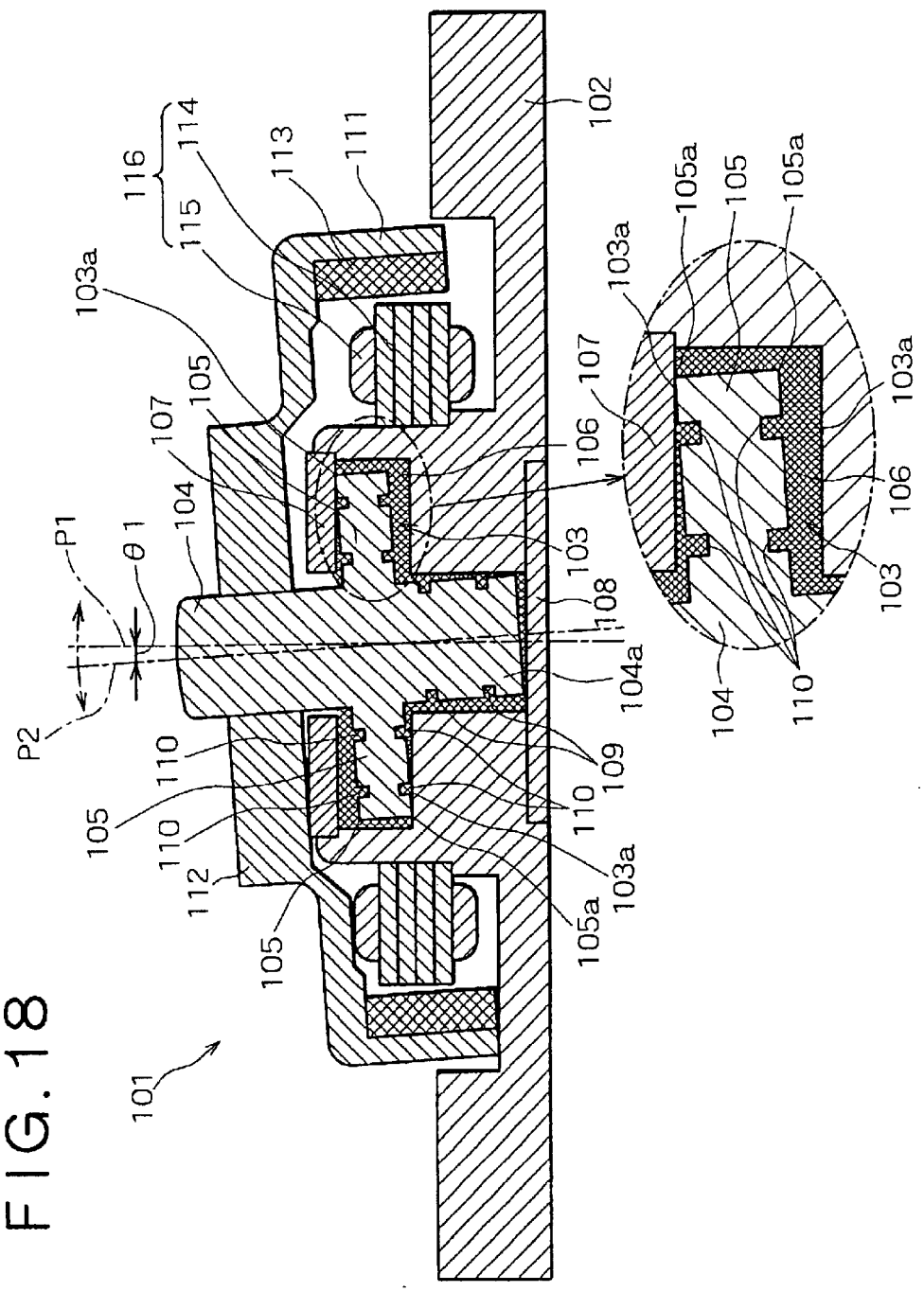
FIG. 18 is a sectional side view showing a state that a spindle of the spindle motor shown in FIG. 17 is tilted.
Figure 19:
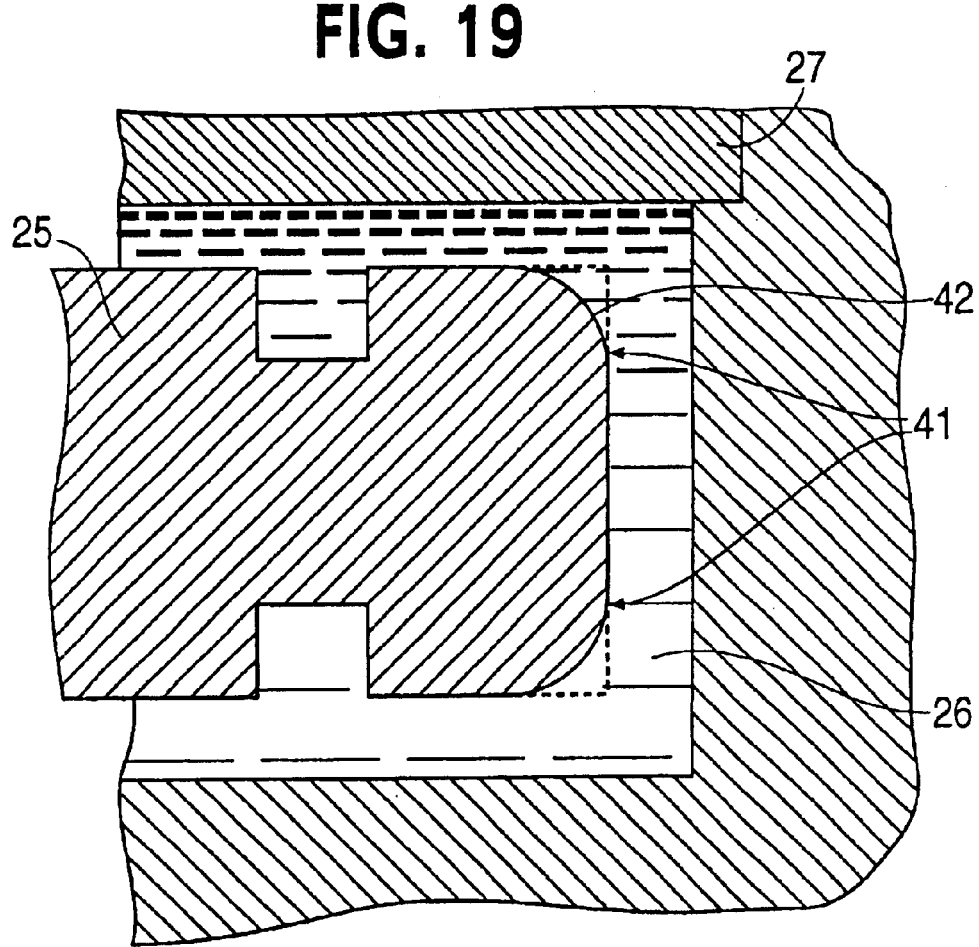
FIG. 19 is an enlarged sectional side view, as shown in FIG. 1, with a rotary disk portion of the spindle disposed apart from an upper plate seal.

According to the spindle motor 21 configured as described above, since the R-faces 42 are formed on the pair of upper and lower edges of the outer peripheral portion of the rotating disk portion 25, even if a gap between the inner wall surface 23a of the hydraulic bearing 23 and each of the spindle 24 and the rotating disk portion 25 is the same as that specified in the related art spindle motor shown in FIGS. 17 and 18 and the spindle 24 is tilted with respect to the motor base 22 at the same specific angle $\theta 1$ as that described with respect to the related art spindle motor shown in FIGS. 17 and 18, the rotating disk portion 25 can be escaped from the inner wall surface 23a of the hydraulic bearing 23 by the effect of providing the R-faces 42, so that the rotating disk portion 25 is not brought into contact with surfaces of the upper plate 27 and the lower plate 28, which surfaces constituting part of the inner wall surface 23a as best shown in FIG. 19.

If the spindle 24 is tilted with respect to the motor base 22 at an angle more than the specific angle $\theta 1$, the R-faces 42 formed on the pair of upper and lower edges of the rotating disk portion 25 will be brought into contact with the upper plate 27 and the lower plate 28; however, in this case, since the R-faces 42 are smoothly rounded unlike the sharp edges of the related art spindle motor, the effect of the contact exerted on a variation in rotational speed of each of the spindle 24 and the rotor 31 may become very small.

In particular, to reduce the above-described effect of the contact, according to one modification of this embodiment, the R-faces 42 of the rotating disk portion 25 are formed into mirror-finished surfaces having a surface roughness of 0.3 s or less in Ra, preferably, 0.1 s or less in Ra. The mirror-finish of the R-faces 42 is effective to still more reduce a frictional force caused by the contact of the R-faces 42 with the upper plate 27 and the lower plate 28.

The use of the spindle motor 21 configured as described above for the R-HDD of the present invention (which will be fully described later) is advantageous as described below. The R-HDD is operated such that a hard disk mounted on the disk table 32 is rotated at a high speed by the spindle motor 21, and in such a rotating state of the hard disk, information is recorded in and/or reproduced from the hard disk by using a flying head slider. During such recording and/or reproducing operation, a moment stronger than the dynamic pressure of the oil caused in the hydraulic bearing 23 may be generated by external vibration/impact or the like and be applied to the spindle 24. Consequently, as shown in FIG. 2, an axis P2 of the spindle 24 may be tilted in the hydraulic bearing 23 with respect to a vertical reference P1 of the motor base 22 at the above-described specific angle θ1. Even in this case, however, according to this embodiment, the contact of the rotating disk portion 25 in the hydraulic bearing 23 with the inner wall surface 23a of the upper plate 27 and the like of the hydraulic bearing 23 can be prevented as much as possible. Even if there may occur the contact therebetween, since the frictional force caused by the contact can be suppressed at a small value, a large braking force does not act on the rotor 31, whereby a variation in rotational speed of the rotor 31 can be made smaller. Accordingly, the recording and/or reproducing of information on and/or from the hard disk can be usually, stably performed. As a result, the use of the spindle motor 21 according to this embodiment makes it possible to realize an R-HDD excellent in vibration-proof.

(2) Second Embodiment of Spindle Motor Using Hydraulic Bearing

Figure 3:
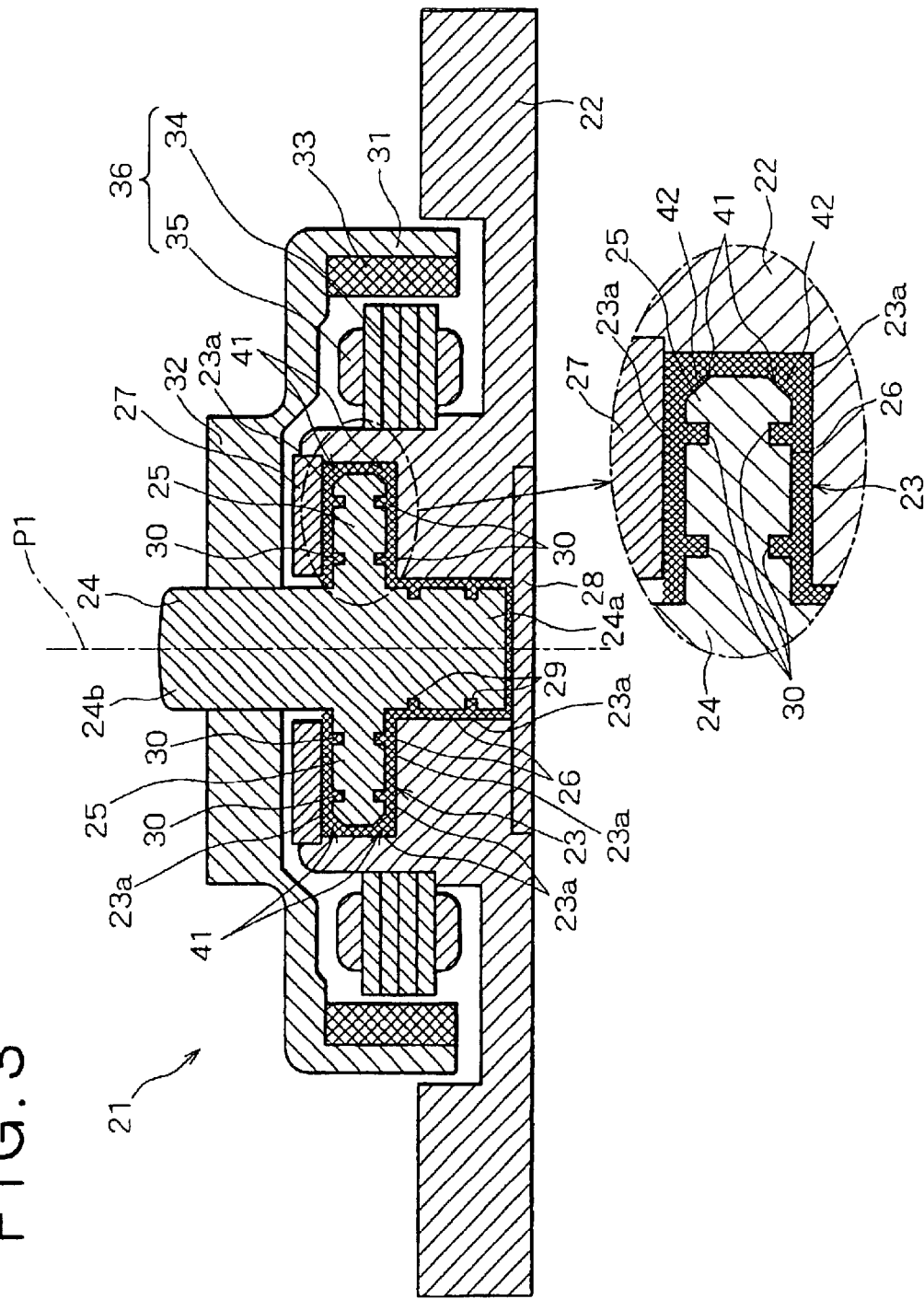
FIG. 3 is a sectional side view illustrating a second embodiment of the spindle motor using a hydraulic bearing according to the present invention.
Figure 4:
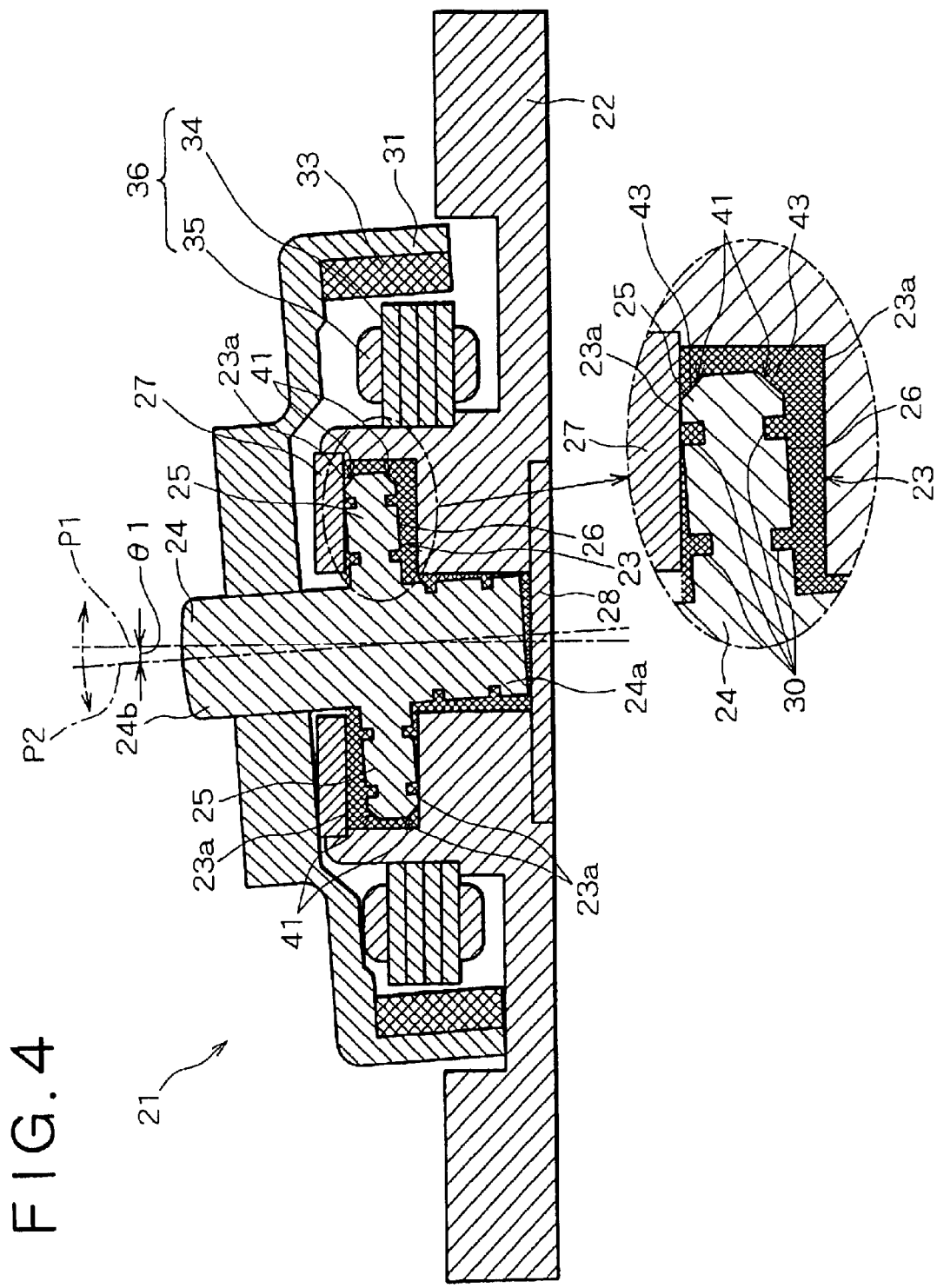
FIG. 4 is a sectional side view showing a state that a spindle of the spindle motor shown in FIG. 3 is tilted.

A second embodiment of the spindle motor 21 using a hydraulic bearing will be described with reference to FIGS. 3 and 4. According to this embodiment, the escape portion 41 for preventing the rotating disk portion 25 from being brought into contact with the inner wall surface 23a of the hydraulic bearing 23 when the spindle 24 is tilted with respect to the motor base 22 at the specific angle θ1 or less is configured as a C-face 43 formed on each of a pair of the upper and lower edges of the outer peripheral portion of the rotating disk portion 25.

Like the modification of the first embodiment, according to one modification of this embodiment, the C-faces 43 are formed into mirror-finished surfaces having a surface roughness of 0.3 s or less in Ra, preferably, 0.1 s or less in Ra.

According to the second embodiment and its modification, the same effects as those obtained by the first embodiment and its modification can be obtained.

(3) Third Embodiment of Spindle Motor Using Hydraulic Bearing

Figure 5:
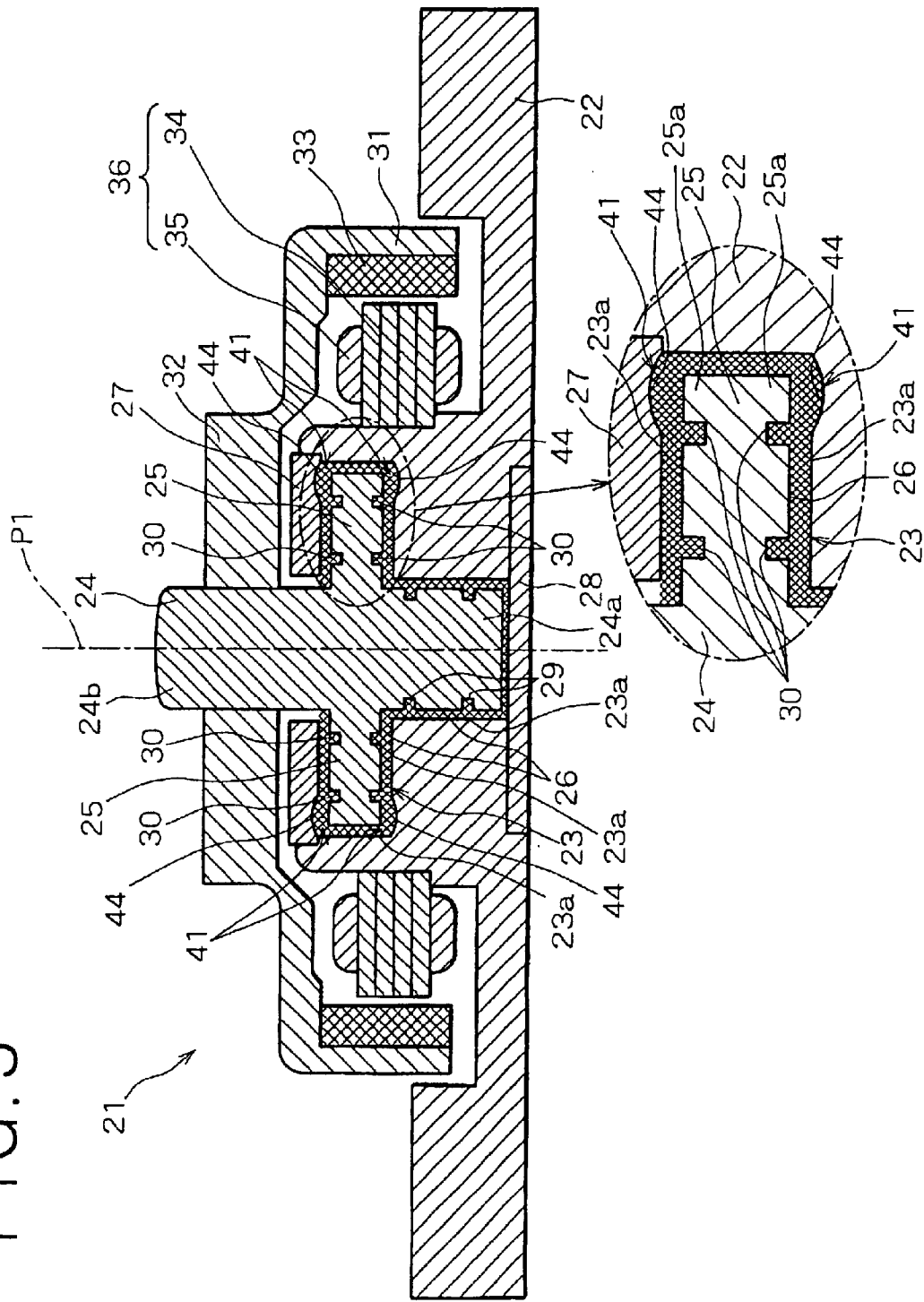
FIG. 5 is a sectional side view illustrating a third embodiment of the spindle motor using a hydraulic bearing according to the present invention.
Figure 6:
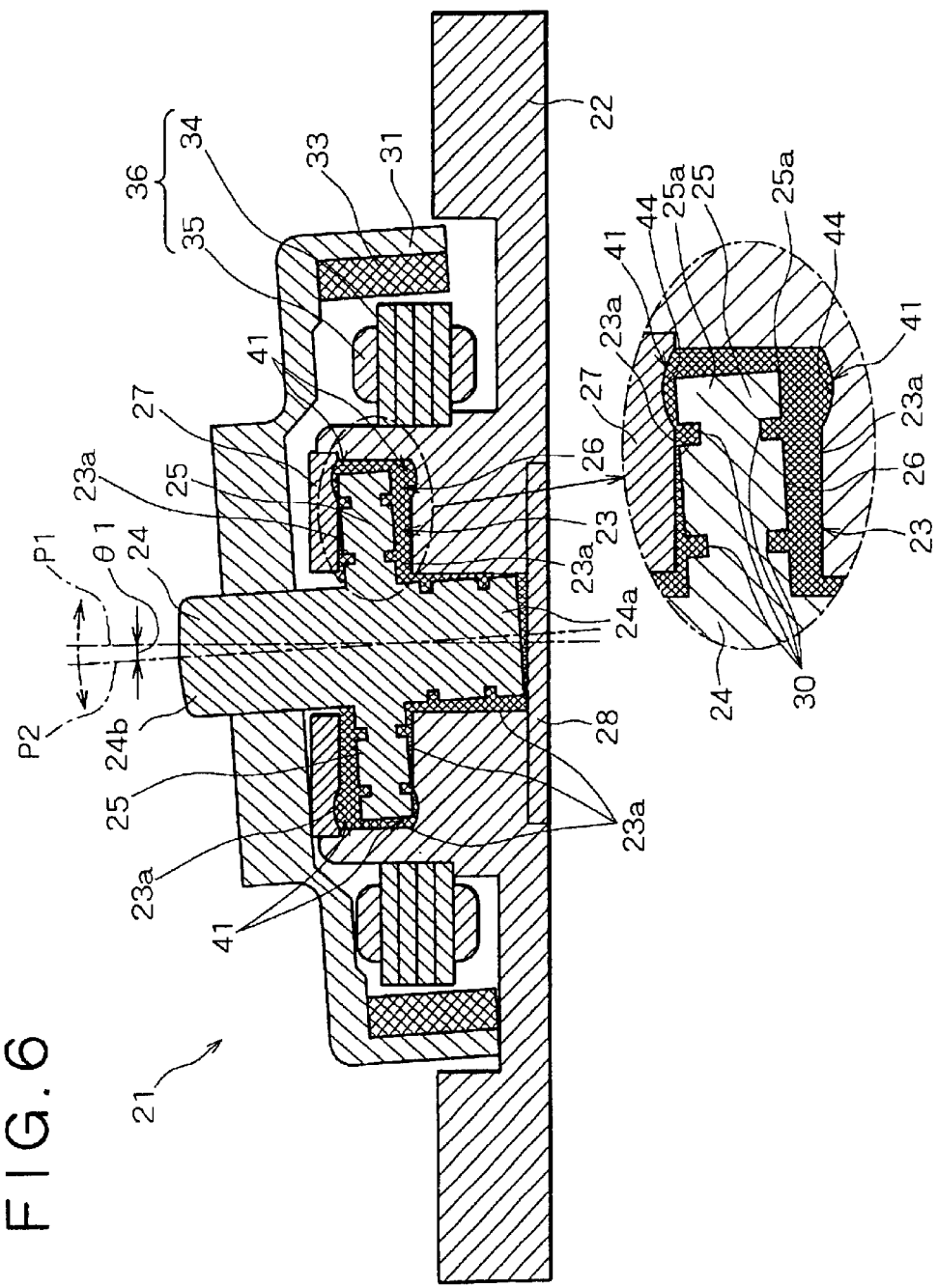
FIG. 6 is a sectional side view showing a state that a spindle of the spindle motor shown in FIG. 5 is tilted.

A third embodiment of the spindle motor 21 using a hydraulic bearing will be described with reference to FIGS. 5 and 6. According to this embodiment, the escape portion 41 for preventing the rotating disk portion 25 from being brought into contact with the inner wall surface 23a of the hydraulic bearing 23 when the spindle 24 is tilted with respect to the motor base 22 at the specific angle θ1 or less is configured as an annular recess 44 formed in a pair of upper and lower edges of inner surfaces 27a and 28a (which constitute parts of the inner wall surface 23a) of the upper plate 27 and the lower plate 28. It is to be noted that the recesses 44 face to the pair of upper and lower edges 25a of the outer peripheral portion of the rotating disk portion 25, and that each of the recesses 44 is formed into the shape of a C-face in cross-section.

Like the modification of each of the first and second embodiments, according to one modification of this embodiment, the recesses 44 are formed into mirror-finished surfaces having a surface roughness of 0.3 s or less in Ra, preferably, 0.1 s or less in Ra.

According to the third embodiment and its modification, the same effects as those obtained by each of the first and second embodiments and its modification can be obtained.

(4) Fourth Embodiment of Spindle Motor Using Hydraulic Bearing

Figure 7:
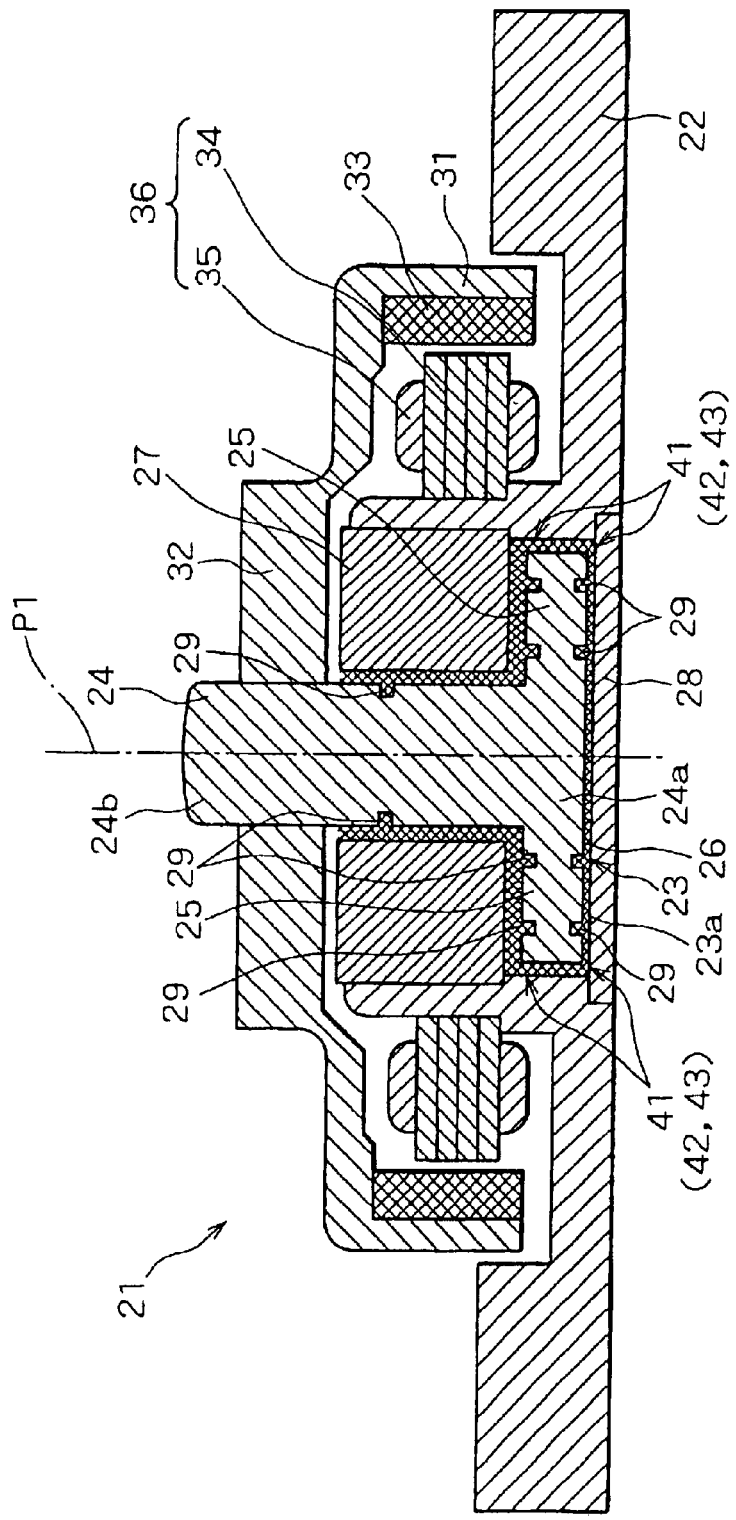
FIG. 7 is a sectional side view illustrating a fourth embodiment of the spindle motor using a hydraulic bearing according to the present invention.

A fourth embodiment of the spindle motor 21 using a hydraulic bearing will be described with reference to FIG. 7. According to this embodiment, a hydraulic bearing 23 having an approximately inverted T-shape is formed in a motor base 22, and a rotating disk portion 25 fixed to or formed integrally with the outer periphery of a lower end 24a of a spindle 24 is floated in the oil 26 that is previously put to fill the hydraulic bearing 23.

Even in this embodiment, the same R-face 42 or C-face 43 as that described above is formed on each of the pair of upper and lower edges of the outer peripheral portion of the rotating disk portion 25, or the same annular recess 44 as that described above is formed in each of the edges of the inner surfaces 27a and 28a of the upper plate 27 and the lower plates 28.

According to the fourth embodiment, the same effect as that obtained by each of the first, second and third embodiment can be obtained.

(5) Description of Removable-Hard Disk Drive Using Spindle Motor

A removable-hard disk drive (R-HDD), to which the spindle motor 21 using the hydraulic bearing according to the present invention is applied, will be described with reference to FIGS. 8 to 16.

Figure 8:
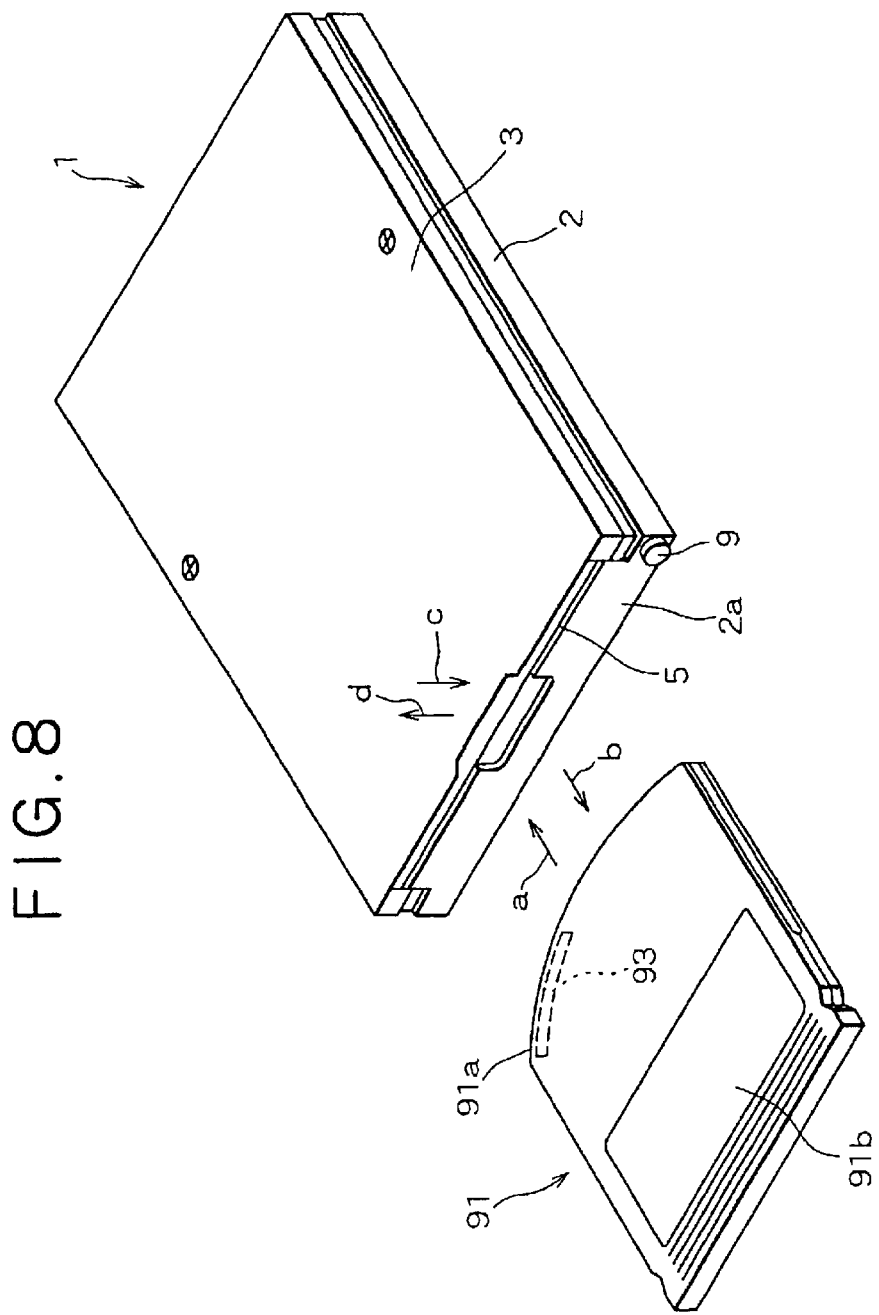
FIG. 8 is a perspective view showing a removable-hard disk drive and a removable-hard disk cartridge.
Figure 9:
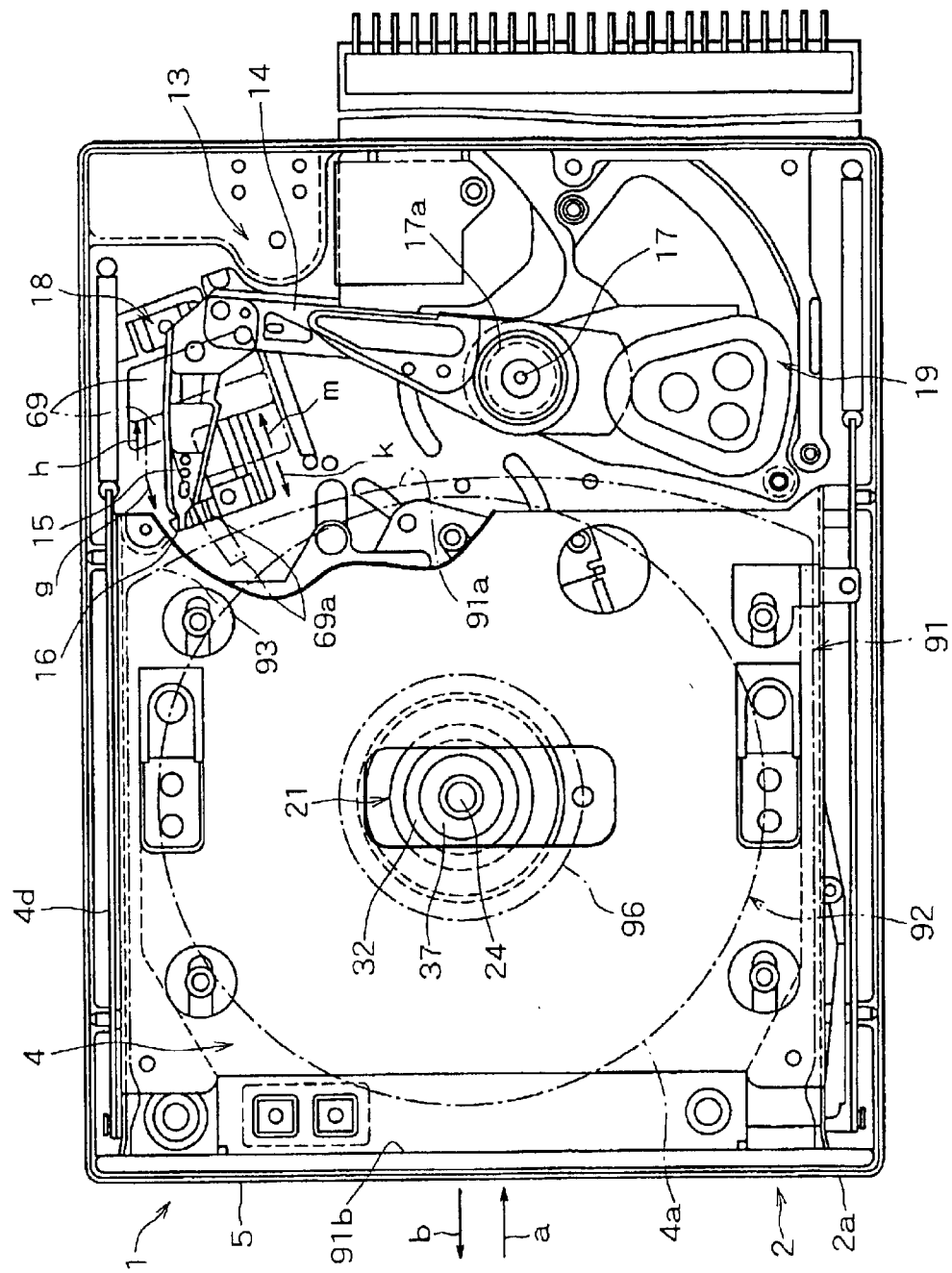
FIG. 9 is a plan view showing a state that an upper cover is removed from the removable-hard disk drive.
Figure 10:
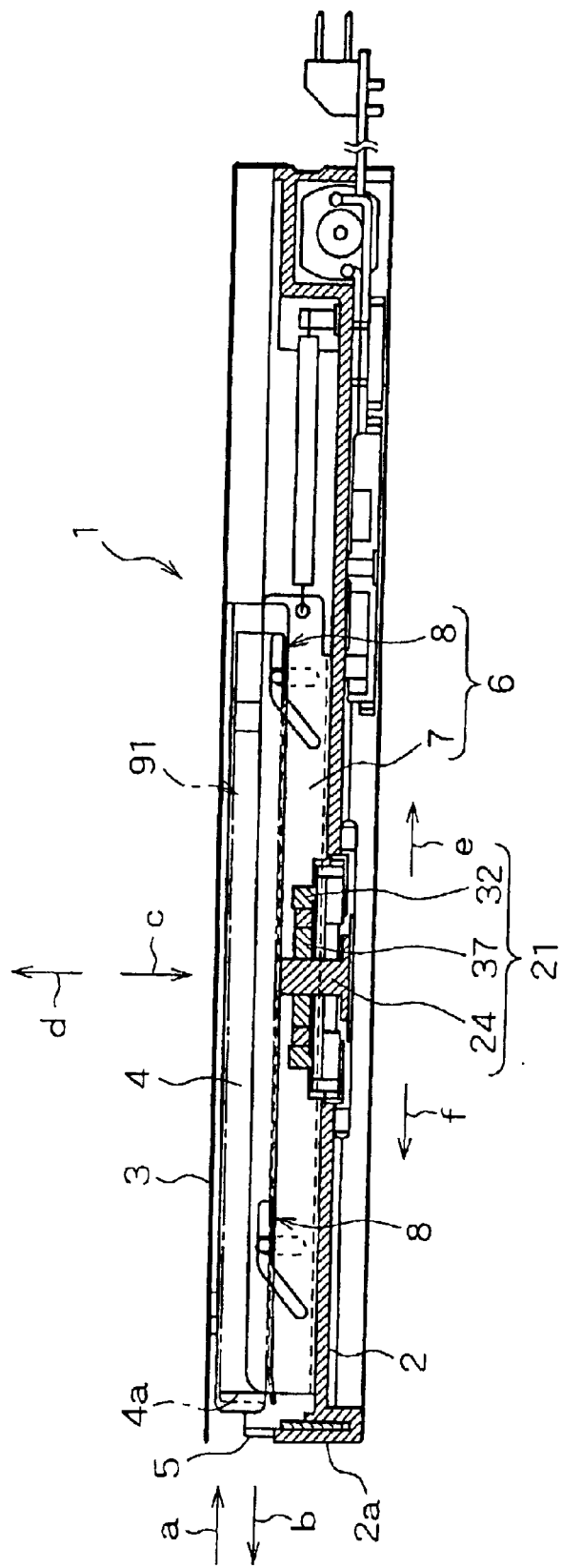
FIG. 10 is a side view, with parts partially cutaway, illustrating a cartridge holder, a lifting mechanism, a spindle motor, and the like of a removable-hard disk drive, and particularly, showing a lifting state of the cartridge holder.
Figure 11:
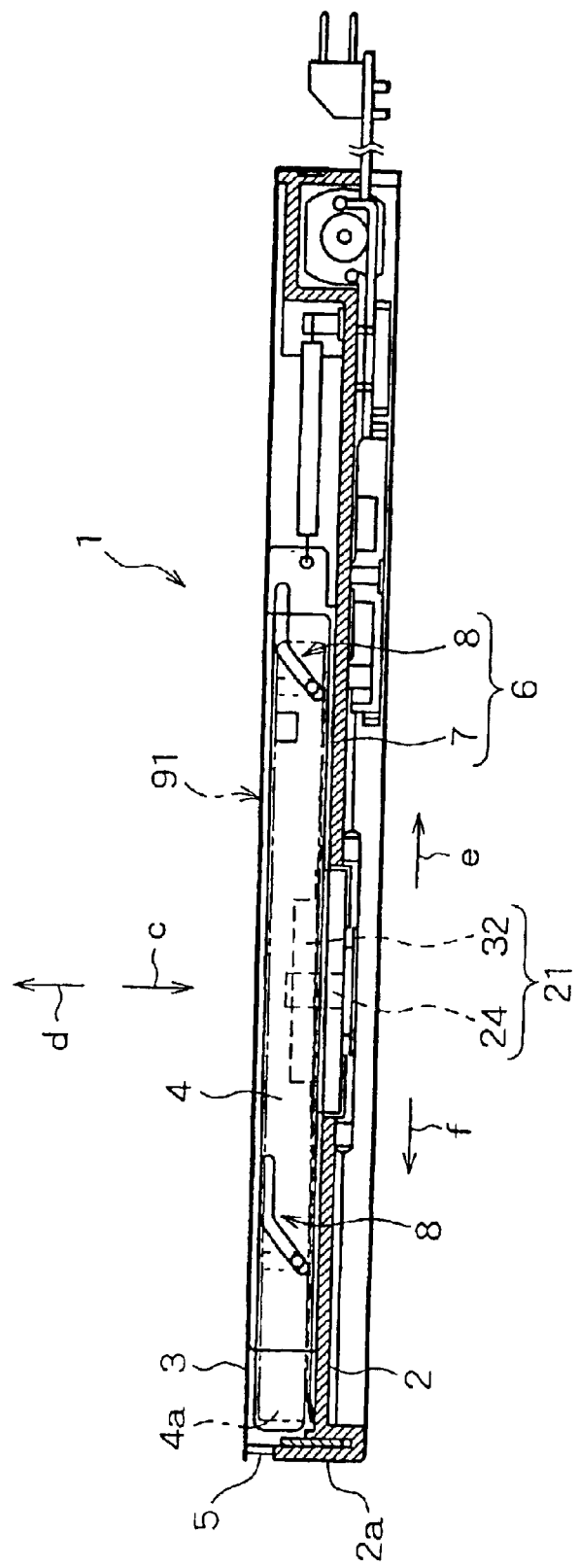
FIG. 11 is a side view, with parts partially cutaway, showing a lowering state of the cartridge holder shown in FIG. 10.

As shown in FIG. 8, an R-HDD 1 has a drive main body 2 with its upper side opened. An upper cover 3 is horizontally disposed on an upper portion of the drive main body 2. Each of the drive main body 2 and the upper cover 3 is made from a metal material such as an aluminum alloy or a synthetic resin. As shown in FIGS. 9, 10 and 11, a cartridge holder 4 formed of a sheet member or the like is horizontally disposed in a front end portion of the drive main body 2. A front end portion of the cartridge holder 4 has a front end opening 4a opened in the horizontal direction. Meanwhile, a front surface 2a of the drive main body 2 has a cartridge insertion port 5 opened in the horizontal direction. When the cartridge holder 4 is lifted to a top position as will be described later, the front end opening 4a of the cartridge holder 4 is aligned to the cartridge insertion port 5 formed in the front surface 2a of the drive main body 2, to be thus exposed. In such a state, the cartridge insertion port 5 of the drive main body 2 allows a removable-hard disk cartridge (R-HDC) 91 to be inserted or discharged, in a direction shown by an arrow "a" (forward direction) or in a direction shown by an arrow "b" (rearward direction), in or from the cartridge holder 4 via the exposed front end opening 4a of the cartridge holder 4.

As primarily shown in FIGS. 10 and 11, the above-described upper cover 3 is integrated with the upper portion of the cartridge holder 4. The cartridge holder 4 can be lifted or lowered, together with the upper cover 3, in a direction shown by an arrow "d" (upward direction) or in a direction shown by an arrow "c" (downward direction) by a lifting mechanism 6 disposed in the drive main body 2. The lifting mechanism 6 is horizontally disposed on a bottom portion of the drive main body 2. The lifting mechanism 6 is composed of a slide plate 7, and four slide cam mechanisms 8 (two on the left side being paired and two on the right side being paired). The slide plate 7 is slid in the direction "a" (forward direction) or the direction "b" (rearward direction). The slide cam mechanisms 8 are driven by the slide plate 7 so as to lift or lower the cartridge holder 4 in the direction "d" (upward direction) or the direction "c" (downward direction). In addition, an eject button 9 is provided on the front surface 2a of the drive main body 2.

Figure 12:
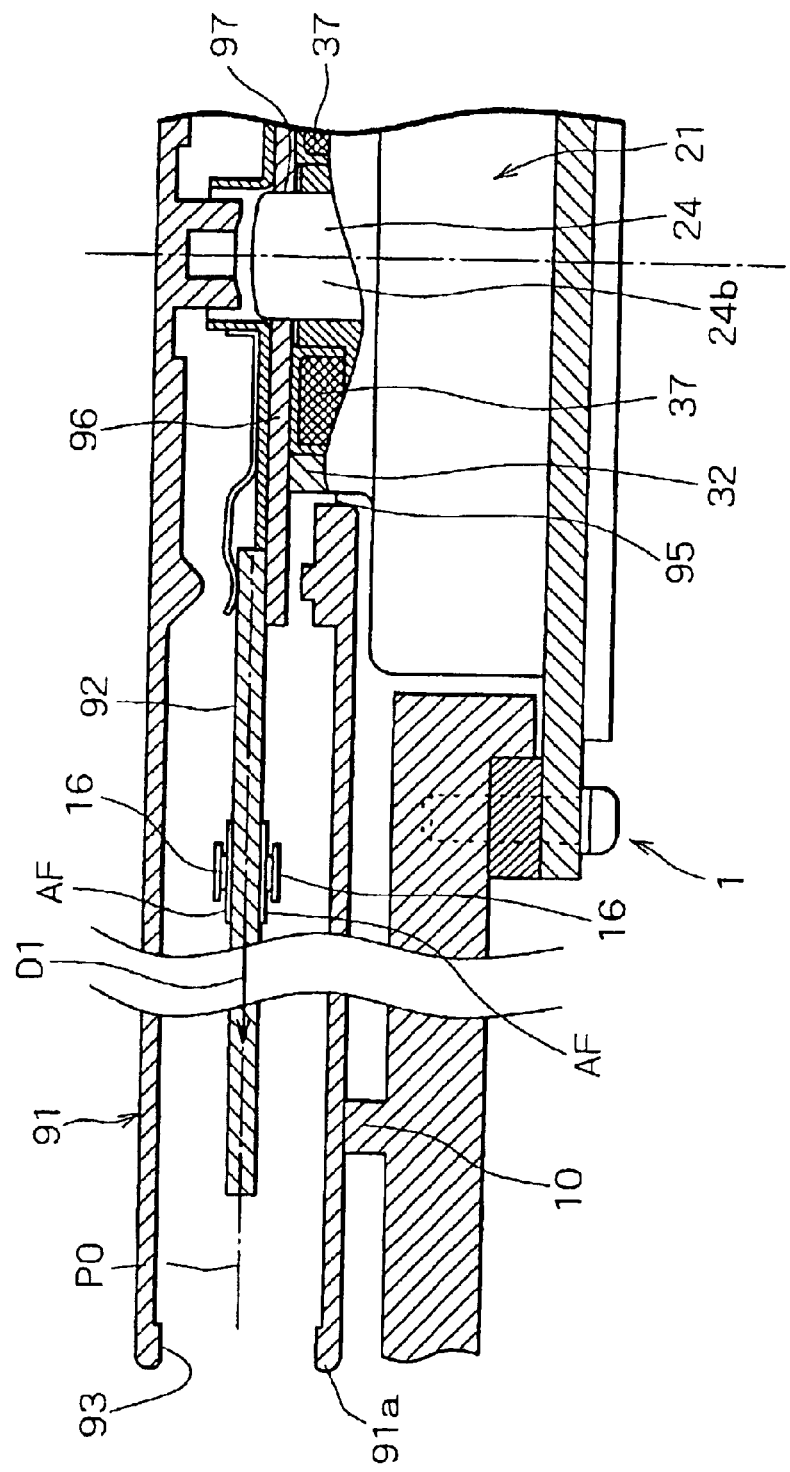
FIG. 12 is a sectional side view showing a state that a hard disk is chucked by the spindle motor by loading a removable-hard disk cartridge in the removable-hard disk drive shown in FIG. 10.

In the drive main body 2, as shown in FIG. 12, the above-described spindle motor 21 using the hydraulic bearing is disposed under the cartridge holder 4. A chucking magnet 37 is buried in the disk table 32 of the spindle motor 21. A bent-type head actuator 13, which is one kind of turnable head actuators, is disposed in the drive main body 2 at a position behind the cartridge holder 4.

Figure 13:
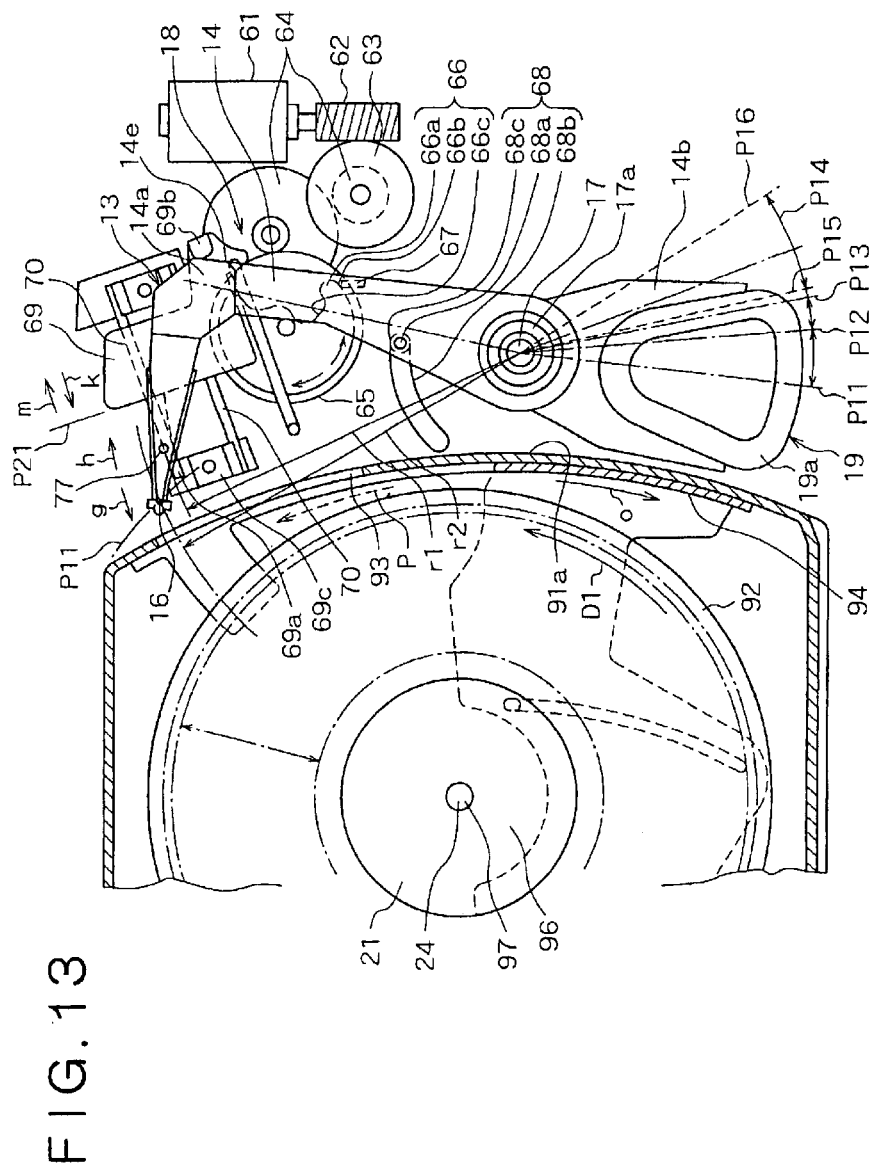
FIG. 13 is a plan view, with parts partially cutaway, illustrating an arm lock position of a bent-type head actuator to a removable-hard disk cartridge in a dynamic load/unload mechanism of the bent-type head actuator of a removable-hard disk drive.

As primarily shown in FIG. 13, the bent-type head actuator 13 includes a head arm 14. A pair of upper and lower suspensions 15 formed of plate springs are mounted to upper and lower surfaces of a leading end 14a of the head arm 14 in such a manner as to be bent at a specific angle. A pair of upper and lower flying head sliders 16, which function as heads, are mounted via gimbals or the like to leading ends of the pair of upper and lower suspensions 15 in such a manner as to be opposed to each other in the vertical direction. In addition, the pair of upper and lower suspensions 15 are symmetrically tilted in such a manner as to become close to the center side of a leading edge 14a of the head arm 14 in the thickness direction as nearing to the leading ends of the suspensions 15, that is, nearing to the pair of upper and lower flying head sliders 16.

An approximately intermediate portion of the head arm 14 of the bent-type head actuator 13 is rotatably mounted via a bearing 17a to the outer periphery of a rotating center shaft 17 vertically mounted to the bottom portion of the drive main body 2. A head actuator drive mechanism is mounted on the bottom portion of the drive main body 2 at a position behind the R-HDC 91 mounted in the R-HDD 1. The head actuator mechanism is operated to reciprocate the bent-type head actuator 13 in directions shown by arrows "g" and "h" in a full reciprocation region between an arm lock position P11 (external position of the R-HDC 91) shown in FIG. 13 and an innermost peripheral position P16 in a position range P14 within a recording area of a hard disk 92 (inner position of the R-HDC 91) shown in FIG. 16. The head actuator mechanism is composed of two drive mechanisms: a cam mechanism 18 provided with a dynamic load/unload ramp (hereinafter, referred simply to as "ramp") 69, and a voice coil motor (hereinafter, referred simply to as "VCM") 19. The cam mechanism 18 and the VCM 19 will be fully described below.

Figure 14:
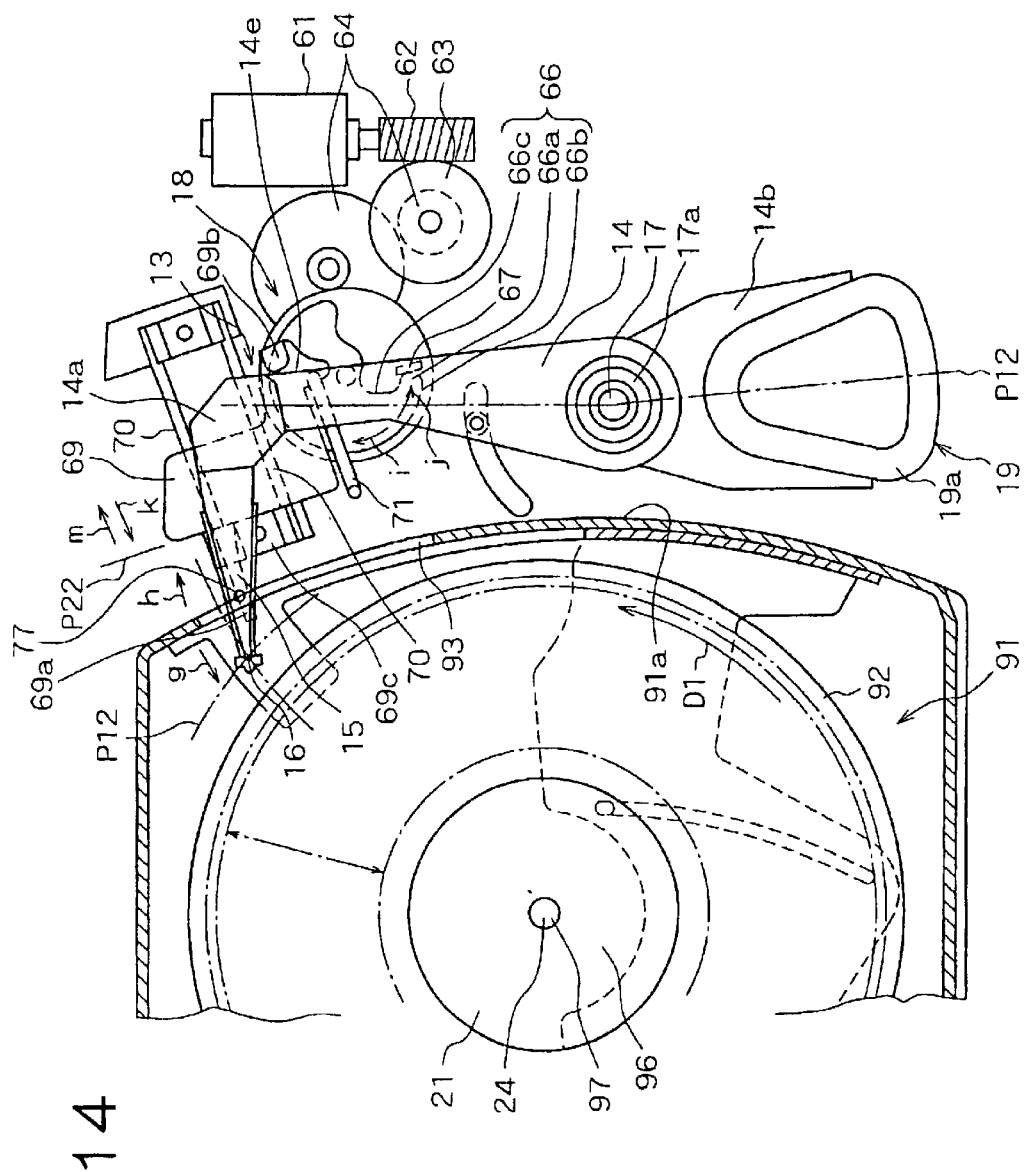
FIG. 14 is a plan view, with parts partially cutaway, illustrating an arm load/unload position of the bent-type head actuator to the removable-hard disk cartridge shown in FIG. 13.

The cam mechanism 18 provided with the ramp 69 is configured to mechanically rotate the bent-type head actuator 13 in the directions "g" and "h" between the arm lock position P11 shown in FIG. 13 and an arm load/unload position P12 set at a position near the outer periphery of the hard disk 92 in the R-HDC 91 shown in FIG. 14. The VCM 19 is configured to rotate the bent-type head actuator 13 in the directions "g" and "h" between the arm load/unload position P12 in the R-HDC 91 shown in FIG. 14 and a landing position P13 at the outermost periphery of the hard disk 92 shown in FIG. 15, and between the landing position P13 shown in FIG. 15 and the innermost peripheral position P16 in the position range P14 within the recording area of the hard disk 92 shown in FIG. 16.

In the case of loading the hard disk 92, the eject button 9 of the R-HDD 1 shown in FIG. 8 is depressed, whereupon the cartridge holder 4 is lifted, together with the upper cover 3, in the direction "d" up to the top position shown in FIG. 10 by the lifting mechanism 6. When the cartridge holder 4 reaches the top position, the front end opening 4a of the cartridge holder 4 is raised to the same height as that of the cartridge insertion port 5 formed in the front surface 2a of the drive main body 2. As a result, the cartridge insertion port 5 is opened.

As shown by a dashed line in FIGS. 9 and 10, the RHDC 91 is inserted horizontally in the direction "a", with its front end 91a taken as the insertion head, from the cartridge insertion port 5 into the cartridge holder 4 via the front end opening 4a. At this time, as shown in FIG. 13, a shutter 94 of the R-HDC 91 is opened in a direction shown by an arrow "o" from a closed position to an opened position against a biasing force of a torsion coil spring (not shown), whereby a head insertion hole 93 is opened. Subsequently, as shown in FIGS. 11 and 12, the slide plate 7 of the lifting mechanism 6 is slid in a direction shown by an arrow "e", so that the cartridge holder 4 is lowered, together with the upper cover 3, in the direction "c" to a bottom position by the two pairs of slide cams 8. As a result, the R-HDC 91 is horizontally mounted on a pair of left and right positioning pins and a pair of left and right height reference pins 10 in the drive main body 2. At this time, as shown in FIG. 12, the disk table 32 of the spindle motor 21 is relatively inserted, from below, in a disk table insertion hole 95 of the R-HDC 91, and the upper end 24b of the spindle 24 of the spindle motor 21 is inserted in a center hole 97 of a center core 96 of the hard disk 92. The center core 96 is horizontally, magnetically chucked on the disk table 32 by the chucking magnet 37. In such a state, the hard disk 92 with its horizontal posture kept is vertically raised in the R-HDC 91 to an approximately intermediate position. The mounting operation of the R-HDC 91 in the R-HDD 1 is thus ended. In the state that the mounting of the R-HDC 91 is ended, since the front end opening 4a of the cartridge holder 4 is offset downwardly from the cartridge insertion port 5 of the drive main body 2, the cartridge insertion port 5 is in the closed state.

In the case of loading the head, after the mounting of the R-HDC 91 is ended, the bent-type head actuator 13 is turned on the basis of a recording or reproducing signal supplied from a host computer or the like by the cam mechanism 18 and a tensile coil spring 71 of the ramp 69. Concretely, the bent-type head actuator 13 is turned around the rotating center shaft 17 in the direction "g" from the arm lock position P11 outside the R-HDC 91 shown in FIG. 13 to the arm load/unload position P12 shown in FIG. 14. At this time, the ramp 69 is slid in a direction shown by an arrow "k" from a stand-by position P21 shown in FIG. 13 to an operational position P22 shown in FIG. 14 while following the bent-type head actuator 13. The ramp 69 comes in contact with a stopper 69c, to be thus stopped at the operational position P22.

After an elapse of a specific time since the bent-type head actuator 13 has initiated its turning motion in the direction "g" from the arm lock position P11, the hard disk 92 in the R-HDC 91 is rotated at a high speed in a direction shown by an arrow D1 by the spindle motor 21. When the bent-type head actuator 13 reaches the arm load/unload position P12 and also the ramp 69 reaches the operational position P22 and stops thereat, the pair of upper and lower flying head sliders 16, the leading end portions of the pair of upper and lower suspensions 15, and a ramp arm 69a, which have been inserted in the head insertion hole 93 formed at a portion, offset toward one side, of the front end 91a of the R-HDC 91, are located at positions near the outer periphery of the hard disk 92.

Figure 15:
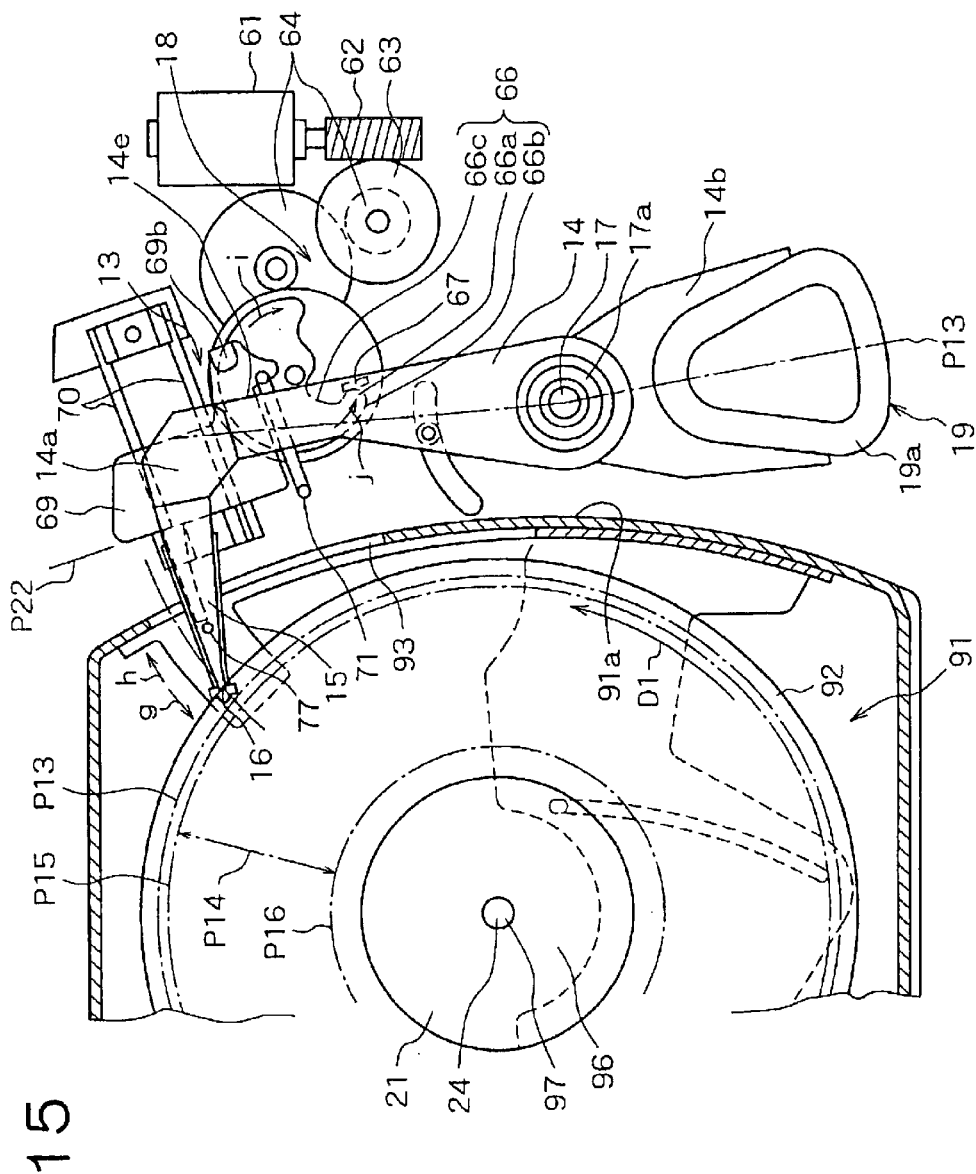
FIG. 15 is a plan view, with parts partially cutaway, illustrating a landing position of the bent-type head actuator to the removable-hard disk cartridge shown in FIG. 13.

After that, with the ramp 69 left as stopped at the operational position P22, only the bent-type head actuator 13 is rotated in the direction "g" from the arm lock load/unload position P12 shown in FIG. 14 to the landing position P13, that is, the outermost peripheral position of the hard disk 92 shown in FIG. 15 by the VCM 19. At this time, the pair of upper and lower flying head sliders 16 are landed from above and below onto the landing position P13 of the hard disk 92 while being opened and closed in the vertical direction by a pair of upper and lower cam planes (not shown) of the ramp arm 69a. As shown in FIG. 12, when the flying head sliders 16 are landed from above and below onto the landing position P13 of the hard disk 92, an air flow AF flowing in the rotational direction D1 is formed on each of upper and lower surfaces of the hard disk 92 that is being rotated at a rotational speed-having already reached a steady speed by the spindle motor 21.

The pair of upper and lower flying head sliders 16 are thus soft-landed on the air flows AF formed on the upper and lower surfaces of the hard disk 92. In other words, the flying head sliders 16 are flied over the upper and lower surfaces of the hard disk 92 in a non-contact state.

Figure 16:
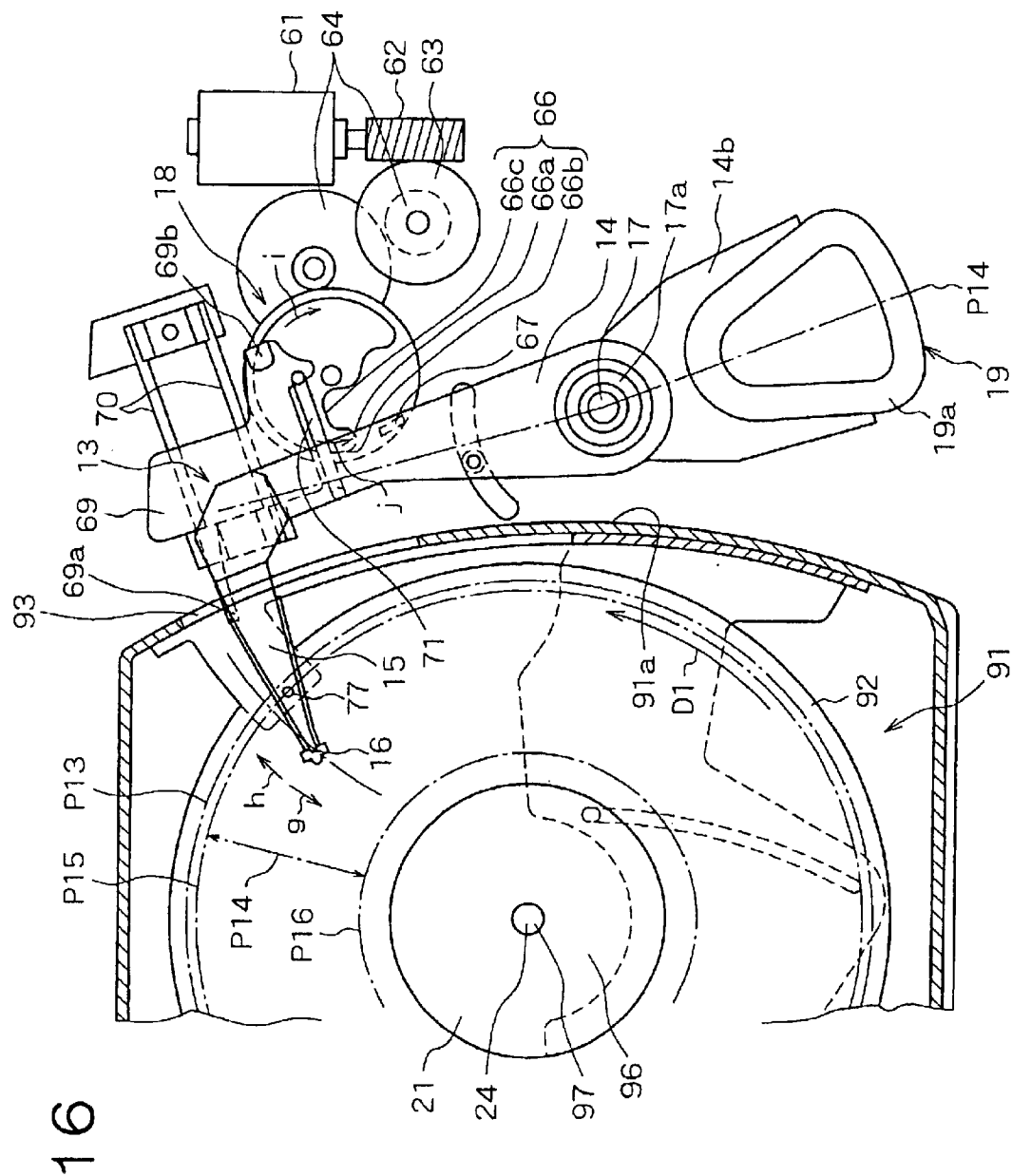
FIG. 16 is a plan view, with parts partially cutaway, illustrating a position within a recording area of the bent-type head actuator to the removable-hard disk cartridge shown in FIG. 13.

As shown in FIG. 16, the bent-type head actuator 13 is then rotated in the direction "g" by the VCM 19, so that the pair of upper and lower flying head sliders 16 are moved from the landing position P13 to the position range P14 within the recording area of the hard disk 92, and further, the bent-type head actuator 13 is moved for seek operation in the directions "g" and "h" in the position range P14 within the recording area, concretely, between an outermost peripheral position P15 and the innermost peripheral position P16 in the position range P14 by the VCM 19, to thereby record or reproduce information on or from a portion, located in the position range P14 within the recording area, of each of the upper and lower surfaces of the hard disk 92 During the operation of recording or reproducing information on or from the hard disk 92, the pair of upper and lower flying head sliders 16 are flied on the air flows AF formed on the upper and lower surfaces of the hard disk 92 by the high-speed rotation of the hard disk 92 in the direction D1, to thereby record or reproduce information on or from the hard disk 92 in a non-contact state.

The disk ejection after the operation of recording or reproducing information on or from the hard disk 92 is performed as follows. The bent-type head actuator 13 is returned in the direction "h" from the position range P14 within the recording area of the hard disk 92 shown in FIG. 16 to the landing position P13 shown in FIG. 15 by the VCM 19, and is then returned in the direction "h" from the landing position P13 shown in FIG. 15 to the arm load/unload position P12 shown in FIG. 14 by the VCM 19.

After the head unload operation, the bent-type head actuator 13 is pulled back against the biasing force of the tensile coil spring 71 in the direction "h" from the arm load/unload position P12 shown in FIG. 14 to the arm lock position P11 shown in FIG. 13 by the cam mechanism 18, and is mechanically locked at the arm load/unload position P12.

After that, the eject button 9 of the R-HDD 1 shown in FIG. 8 is depressed, to move the slide plate 7 of the lifting mechanism 6 in the direction "f" as shown in FIG. 10, whereupon the cartridge holder 4 is lifted to the top position shown in FIG. 10 by the four slide cams 8, so that the R-HDC 91 is removed upwardly from the spindle motor 21. The R-HDC 91 is then pushed in the forward direction "b" by a pushing mechanism (not shown) of the cartridge holder 4, to be moved out of the cartridge insertion port 5 of the drive main body 2 by a specific length via the front end opening 4a of the cartridge holder 4. At this time, the shutter 94 of the R-HDC 91 is moved in a closing direction shown by an arrow "p" in FIG. 13, to close the head insertion port 93. The R-HDC 91 in such a state is ready to be ejected out of the cartridge insertion port 5 in the direction "b" by a user holding a rear end 91b of the R-HDC 91.

(6) Description of Dynamic Load/Unload Mechanism for Removable-Hard Disk Drive

A dynamic load/unload mechanism used for the R-HDD 1 will be described with reference to FIGS. 13 to 16.

The cam mechanism 18 is operated to rotate the bent-type head actuator 13 around the rotating center shaft 17 in the directions "g" and "h" between the arm lock position P11 shown in FIG. 13 and the arm load/unload position P12 shown in FIG. 14. This cam mechanism 18 includes a self-lock mechanism serving as a reduction mechanism composed of a worm 62 rotated in the normal and reversal directions by a drive motor 61 and a worm wheel 63 meshed with the worm 62, and a cam gear 65 rotated in the normal and reversal directions, that is, directions "i" and "j" by the worm wheel 63 via a plurality of reduction gears 64. Mode sensors (not shown) for sequentially detecting the present position of the bent-type head actuator 13 in the directions "g" and "h" are additionally provided for the cam gear 65 and the like.

A circular cam 66, which is substantially concentric with the cam gear 65, is integrally formed on the upper surface of the cam gear 65. The cam 66 drives a cam driven portion 67. The cam driven portion 67 is integrally provided on a back surface of the head arm 14 of the bent-type head actuator 13 at a position nearly intermediate between the leading end 14a and the rotating center shaft 17. The cam 66 has a projecting portion 66a projecting in the direction "j" toward the cam driven portion 67, an outer peripheral surface 66b extending from the projecting portion 66a in the direction "i", and a cutout portion 66c formed in a portion, on the direction "j" side, of the projecting portion 66a. The projecting portion 66a and the outer peripheral surface 66b constitute a drive portion of the cam driven portion 67. The cutout portion 66c is formed as a space for allowing the cam driven portion 67 to be escaped therein. A stopper 68 is provided for positioning the bent-type head actuator 13 at the arm lock position P11 shown in FIG. 13. The stopper 68 includes a stopper pin 68a vertically fixed to the back surface of the head arm 14, a guide hole 68b formed into a circular-arc shape on the bottom portion of the drive main body 2 in order to guide the stopper pin 68a, and an end portion 68c, located on the direction "h" side, of the guide hole 68b. It is to be noted that the guide hole 68b is formed into the circular-arc shape centered at the rotating center shaft 17.

The ramp 69 is slidably moved, while being guided by a pair of slide guides 70 mounted on the bottom portion of the drive main body 2, in directions "k" and "m" nearly along the movement mechanism of the pair of upper and lower flying head sliders 16 between the stand-by position P21 shown in FIG. 13 and the operational position P22 shown in FIG. 14. The above-described tensile coil spring 71 functioning as sliding motion biasing mean is, as shown in FIG. 14, provided between the ramp 69 and the drive main body 2. The ramp 69 is slid in the direction "k" from the stand-by position P21 to the operational position P22 by the biasing force of the tensile coil spring 71.

The ramp 69 is made from a synthetic resin or the like, and a ramp arm 69a is integrally formed on an upper surface of an end portion, on the direction "k" side, of the ramp 69. The ramp arm 69a opens and closes the pair of upper and lower flying head sliders 16 of the bent-type head actuator 13 in the vertical direction in cooperation with the spring forces of the pair of upper and lower suspensions 15. The ramp arm 69a extends from the ramp 69 in the direction "g" so as to be horizontally inserted between the leading ends of the pair of upper and lower suspensions 15 of the bent-type head actuator 13. The ramp arm 69a is formed into a circular-arc shape extending nearly along the turning locus of the pair of upper and lower flying head sliders 16 in the directions "gin" and "h". A rotational radius r1 of the ramp arm 69a around the rotating center shaft 17 is smaller than a rotational radius r2 of the pair of upper and lower flying head sliders 16 around the rotating center shaft 17.

A head actuator pressing portion 69b is integrally formed on an upper surface of an end portion, on the direction "m"

side, of the ramp 69. The head actuator pressing portion 69b is in contact with an outer surface 14e of the head arm 14 of the bent-type head actuator 13 in the direction "k", so that the spring force of the tensile coil spring 71 for sliding the ramp 69 in the direction "k" is transmitted to the bent-type head actuator 13 via the head actuator pressing portion 69b, with a result that the bent-type head actuator 13 is biased to be rotated in the direction "g" by the spring force of the tensile coil spring 71. In addition, a stopper 69c for stopping the ramp 69 at the operational position P22 is fixed on the bottom portion of the drive main body 2.

The VCM 19 is configured to rotate the bent-type head actuator 13 around the rotating center shaft 17 in the directions "g" and "h" by applying a current to a coil 19a fixed to a rear end 14b of the head arm 14 of the bent-type head actuator 13.

The cam mechanism 18, the ramp 69, the tensile coil spring 71, and the VCM 19, which are configured as described above, are operated as follows. First, in the case of rotating the bent-type head actuator 13 in the direction "h" up to the arm lock position P11 shown in FIG. 13 and locking the bent-type head actuator 13 at the arm lock position P11 shown in FIG. 13, the cam gear 65 is rotated, by the drive motor 61 of the cam mechanism 18 via the worm 62, the worm wheel 63, and the plurality of reduction gears 64, in the direction "j" from a position shown in FIG. 16 to a position shown in FIG. 13, and is stopped at the position shown in FIG. 13. At this time, the cam driven portion 67 of the bent-type head actuator 13 is pushed in the direction "j" by the projecting portion 66a of the cam 66. As a result, the bent-type head actuator 13 is turned around the rotating center shaft 17 in the direction "h" from the arm load/unload position P12 shown in FIG. 14 to the arm lock position P11 shown in FIG. 13, and is stopped at the arm lock position P11 shown in FIG. 13 by the stopper 68. When the bent-type head actuator 13 has been stopped by the stopper 68, the projecting portion 66a of the cam 66 is almost simultaneously escaped from the cam driven portion 67 in the direction "j" and thereby the position of the cam driven portion 67 is restricted by the outer peripheral surface 66b of the cam 66. The bent-type head actuator 13 is thus locked at the arm lock position P11 in a state being mechanically clamped between the stopper 68 and the outer peripheral surface 66b of the cam 66.

When the bent-type head actuator 13 is turned in the direction "h" from the arm load/unload position P12 to the arm lock position P11, the head actuator pressing portion 69b of the ramp 69 is pushed in the direction "m" by the bent-type head actuator 13, so that the ramp 69 follows the bent-type head actuator 13, to be slid in the direction "m" along the pair of slide guides 70 from the operational position P22 shown in FIG. 14 to the stand-by position P21 shown in FIG. 13. At this time, the tensile coil spring 71 is pulled in the direction "m" by the ramp 69, whereby a drive force for rotating the bent-type head actuator 13 in the direction "g" is charged to the tensile coil spring 71. At these arm lock position P11 and the stand-by position P21, the pair of upper and lower flying head sliders 16 at the leading end of the bent-type head actuator 13 and the ramp arm 69a are in a state being pulled out of the head insertion hole 93 of the R-HDC 91.

In the case of rotating the bent-type head actuator 13 in the direction "g" from the arm lock position P11 shown in FIG. 13 to the arm load/unload position P12 shown in FIG. 14, since the cam gear 65 is rotated, by the drive motor 61 of the cam mechanism 18 via the worm 62, the worm wheel 63, and the plurality of reduction gears 64, in the direction "i" from the position shown in FIG. 13 to the position shown in FIG. 16 and is stopped at the position shown in FIG. 16, in the intermediate position of the cam gear 65 shown in FIG. 14 (between the position shown in FIG. 13 and the position shown in FIG. 16), the cam driven portion 67 of the bent-type head actuator 13 relatively runs from the outer peripheral surface 66b of the cam 66 onto the projecting portion 66a of the cam 66. Then, along with the subsequent rotation of the cam 66 in the direction "i", the ramp 69 is started to be slid in the direction "k" from the stand-by position P21 by the drive force charged in the tensile coil spring 71, so that the bent-type head actuator 13 is rotated in the direction "g" via the head actuator pressing portion 69b of the ramp 69.

Accordingly, since the cam gear 65 is rotated in the direction "i" from the position shown in FIG. 13 to the position shown in FIG. 16 by the drive motor 61, the bent-type head actuator 13 is rotated, by the drive force charged in the tensile coil spring 71, around the rotating center shaft 17 in the direction "g" from the arm lock position P11 shown in FIG. 13 to the arm load/unload position P12 that is set at a position near the outer periphery of the hard disk 92 within the R-HDC 91 shown in FIG. 14. At this time, the ramp 69 follows the bent-type head actuator 13, to be slid in the direction "k" from the stand-by position P21 shown in FIG. 13 to the operational position P22 shown in FIG. 14. The ramp 69 comes in contact with the stopper 69c at the operational position P22, to be stopped thereat. The head actuator pressing portion 69b integrated with the ramp 69 is also stopped at the position shown in FIG. 14. At the time of head load operation (which will be described later), the bent-type head actuator 13 is rotated in the direction "g" independently from the head actuator pressing portion 69b.

To be more specific, the bent-type head actuator 13 is rotated in the direction "g" from the arm lock position P11 to the arm load/unload position P12 by the tensile coil spring 71, and when the bent-type head actuator 13 reaches the arm load/unload position P12, the tensile coil spring 71 is separated from the bent-type head actuator 13. The cam gear 65 is then rotated, by the drive motor 61, in the direction "i" up to the position shown in FIG. 16 and is stopped thereat, and in this state, the cam driven portion 67 of the bent-type head actuator 13 can be moved in the directions "g" and "h", that is, forwardly, outwardly of the cam 66 in the cutout portion 66c of the cam 66.

In addition, as described above, since the cam gear 65 is rotated, by the drive motor 61 of the cam mechanism 18 via the worm 62, the worm wheel 63, and the plurality of reduction gears 64, in the direction "j" from the position shown in FIG. 16 and is stopped at the position shown in FIG. 13, at the intermediate position of the cam gear 65 shown in FIG. 14, the projecting portion 66a of the cam 66 comes in contact with the cam driven portion 67 of the bent-type head actuator 13, to turn the cam driven portion 67 in the direction "j", whereby the bent-type head actuator 13 is pushed back in the direction "h" from the arm load/unload position P12 to the arm lock position P11. The bent-type head actuator 13 is, as shown in FIG. 13, stopped at the arm lock position P11 by the stopper 68, and almost simultaneously, the projecting portion 66a of the cam 66 passes the cam driven portion 67 in the direction "j", with the result that the bent-type head actuator 13 is held between the outer peripheral surface 66b of the cam 66 and the stopper 68, to be thereby mechanically locked.

The head load/unload operation of the dynamic load/unload mechanism will be described below.

The head load operation of the dynamic load/unload mechanism will be first described. After the mounting of the R-HDC 91 to the R-HDD 1 is ended, the bent-type head actuator 13 is driven, on the basis of a recording or reproducing signal supplied from a host computer or the like, by the cam mechanism 18 and the tensile coil spring 71 of the ramp 69 in such a manner as to be rotated around the rotating center shaft 17 in the direction "g" from the arm lock position P11 outside the R-HDC 91 shown in FIG. 13 to the arm load/unload position P12 shown in FIG. 14. At this time, as described above, the ramp 69 follows the bent-type head actuator 13, to be slid in the direction "k" from the stand-by position P21 shown in FIG. 13 to the operational position P22 shown in FIG. 14, and the ramp 69 comes in contact with the stopper 69c to be stopped at the operational position P22.

The bent-type head actuator 13 is then started to be rotated in the direction "g" from the arm lock position P11, and after an elapse of a specific time, the hard disk 92 is started to be rotated in the direction D1 by the spindle motor 21.

When the bent-type head actuator 13 reaches the arm load/unload position P12 and the ramp 69 also reaches the operational position P22 and stops thereat, the pair of upper and lower flying head sliders 16 and the leading end of the ramp arm 69a are inserted, through the head insertion hole 93 of the R-HDC 91, to positions near the outer periphery of the hard disk 92. At this time, the rotational speed of the spindle motor 21 nearly reaches the steady speed.

After that, with the ramp 69 left as stopped at the operational position P22, only the bent-type head actuator 13 is rotated in the direction "g" from the arm load/unload position P12 shown in FIG. 14 to the landing position P13 that is the outermost peripheral position of the hard disk 92 shown in FIG. 15 by the VCM 19. At this time, the head load operation is performed as follows: namely, the pair of upper and lower flying head sliders 16 are landed from above and below onto the landing position P13 of the hard disk 92, which disk is being rotated at the steady speed by the spindle motor 21, while being opened and closed in the vertical direction by the pair of upper and lower cam planes (not shown) of the ramp arm 69a.

In addition, a pair of upper and lower sliding projections 77 are formed on inner surfaces of the leading end portions of the pair of upper and lower suspensions 15 of the bent-type head actuator 13. At the time of the head load operation, the sliding projections 77 are slid in the direction "g" on the pair of upper and lower cam planes (not shown) formed on the upper and lower surfaces of the ramp arm 69a, to open and close the pair of upper and lower flying head sliders 16 in the vertical direction by the cam function of the cam planes of the ramp arm 69a.

In this case, since the pair of upper and lower flying head sliders 16 are landed from above and below on the upper and lower surfaces of the hard disk 92 in the state that the rotational speed of the hard disk 92 rotated by the spindle motor 21 has reached the steady speed, the head load operation is carried out in the state that the air flow AF flowing in the rotational direction D1 has been formed on each of the upper and lower surfaces of the hard disk 92. As a result, the pair of upper and lower flying head sliders 16 are soft-landed on the air flows AF formed on the upper and lower surfaces of the hard disk 92. In other words, the flying head sliders 16 are flied over the upper and lower surfaces of the hard disk 92 in a non-contact state.

As shown in FIG. 16, the bent-type head actuator 13 is then rotated in the direction "g" by the VCM 19, so that the pair of upper and lower flying head sliders 16 are moved from the landing position P13 to the position range P14 within the recording area of the hard disk 92, and further, the bent-type head actuator 13 is moved for seek operation in the directions "g" and "h" in the position range P14 within the recording area, concretely, between an outermost peripheral position P15 and the innermost peripheral position P16 in the position range P14 by the VCM 19, to thereby record or reproduce information in or from a portion, located in the position range P14 within the recording area, of each of the upper and lower surfaces of the hard disk 92. During the operation of recording or reproducing information on or from the hard disk 92, the pair of upper and lower flying head sliders 16 are flied on the air flows AF formed on the upper and lower surfaces of the hard disk 92 by the high-speed rotation of the hard disk 92 in the direction D1, to thereby record or reproduce information on or from the hard disk 92 in a non-contact state.

The head unload operation after recording or reproducing information on or from the hard disk 92 is carried out in the following procedure. The bent-type head actuator 13 is first returned in the direction "h" from the position range P14 within the recording area of the hard disk 92 shown in FIG. 16 to the landing position P13 shown in FIG. 15 by the VCM 19, and is then returned from the landing position P13 shown in FIG. 15 to the arm load/unload position P12 shown in FIG. 14.

At this time, the head unload operation is carried out in the procedure reversed to that of the head load operation. That is to say, the pair of upper and lower sliding projections 77 formed on the pair of the upper and lower suspensions 15 are slid on the pair of upper and lower cam planes of the ramp arm 69a, whereby the pair of upper and lower flying head sliders 16 are discharged in the direction "h", that is, outwardly from the hard disk 92 while being separated from the landing position P13 of the hard disk 92 in the vertical direction.

After the head unload operation, the bent-type head actuator 13 is pulled back, by the cam mechanism 18, against the biasing force of the tensile coil spring 71 in the direction "h" from the arm load/unload position P12 shown in FIG. 14 to the arm lock position P11 shown in FIG. 13, and is mechanically locked at the arm lock position P11.

The above-described embodiments have been described by example of the configuration that the hydraulic bearing structure of the present invention is applied to the spindle motor; however, the hydraulic bearing structure of the present invention may be applied to any other motor than the spindle motor.

While the preferred embodiments have been described using specific terms, such description is for illustrative purposes only, and it is to be understood that changes and variations may be made without departing from the spirit or scope of the following claims.

What is claimed is:

1. A spindle motor comprising:
a spindle;
a rotating disk portion rotatable integrally with said spindle; and
a hydraulic bearing, formed in a motor base, for rotatably supporting said rotating disk portion;
wherein an escape portion is provided for preventing said rotating disk portion from being brought into contact with an inner wall surface of said hydraulic bearing when said spindle is tilted with respect to said motor base at a specific angle or less, the specific angle being within a range of the tilted angle when an outer peripheral corner of a rotor of the spindle motor touches a stator of the spindle motor, wherein said escape portion is configured as a recess formed in the inner wall surface of said hydraulic bearing at a position facing an edge of an outer periphery of said rotating disk portion.

2. A spindle motor according to claim 1, wherein said spindle motor is a flat brushless motor.

3. A hydraulic bearing structure comprising:

a hydraulic bearing, formed in a motor base, for rotatably supporting a rotating disk portion rotatable integrally with a spindle;

wherein an escape portion is provided for preventing said rotating disk portion from being brought into contact with an inner wall surface of said hydraulic bearing when said spindle is tilted with respect to said motor base at a specific angle or less, the specific angle being within a range of the tilted angle when an outer peripheral corner of a rotor of the spindle motor touches a stator of the spindle motor, wherein said escape portion is configured as a recess formed in the inner wall surface of said hydraulic bearing at a position facing an edge of an outer periphery of said rotating disk portion.

4. A disk drive comprising:

a spindle motor including:

a spindle;

a rotating disk portion rotatable integrally with said spindle; and a hydraulic bearing, formed in a motor base, for rotatably supporting said rotating disk portion;

wherein an escape portion is provided for preventing said rotating disk portion from being brought into contact with an inner wall surface of said hydraulic bearing when said spindle is tilted with respect to said motor base at a specific angle or less, the specific angle being within a range of the tilted angle when an outer peripheral corner of a rotor of the spindle motor touches a stator of the spindle motor, wherein said escape portion is configured as a recess formed in the inner wall surface of said hydraulic bearing at a position facing an edge of an outer periphery of said rotating disk portion, said disk drive being operated to rotate an information recording disk by said spindle motor, thereby recording and/or reproducing information on and/or from said disk by a flying head slider.

5. A disk drive according to claim 4, wherein said information recording disk is a removable-hard disk contained in a cartridge.

* * * * *